(12) United States Patent
Itoguchi et al.

(10) Patent No.: US 10,537,871 B2
(45) Date of Patent: Jan. 21, 2020

(54) SYSTEM FOR PRODUCING POLYOLEFIN, METHOD OF PRODUCING POLYOLEFIN, AND METHOD OF PRODUCING HETEROPHASIC PROPYLENE POLYMER MATERIAL

(71) Applicant: SUMITOMO CHEMICAL COMPANY, LIMITED, Tokyo (JP)

(72) Inventors: Satoshi Itoguchi, Ichihara (JP); Masayuki Arakawa, Ichihara (JP); Naoto Yoshimura, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 175 days.

(21) Appl. No.: 15/665,912

(22) Filed: Aug. 1, 2017

(65) Prior Publication Data

US 2018/0036708 A1     Feb. 8, 2018

(30) Foreign Application Priority Data

Aug. 3, 2016  (JP) ................. 2016-153179

(51) Int. Cl.
    *C08F 210/06*    (2006.01)
    *B01J 8/12*      (2006.01)
    (Continued)

(52) U.S. Cl.
    CPC ............. *B01J 19/242* (2013.01); *B01J 8/003* (2013.01); *B01J 8/1827* (2013.01); *B01J 8/20* (2013.01);
    (Continued)

(58) Field of Classification Search
    None
    See application file for complete search history.

(56) References Cited

U.S. PATENT DOCUMENTS

| 2,477,454 A | 7/1949 | Heath |
| 2,867,506 A | 1/1959 | Roberts |

(Continued)

FOREIGN PATENT DOCUMENTS

| CA | 739660 A | 8/1966 |
| EP | 0088638 A2 | 9/1983 |

(Continued)

OTHER PUBLICATIONS

Extended European Search Report dated Dec. 13, 2017, for corresponding European Application No. 17184284.2.

(Continued)

*Primary Examiner* — Richard A Huhn
(74) *Attorney, Agent, or Firm* — Birch, Stewart, Kolasch & Birch, LLP

(57) ABSTRACT

Provided are a system for producing a polyolefin, a method of producing a polyolefin, and a method of producing a heterophasic propylene polymer material, each of which allows (i) a gel, to be contained in a molded product that is made of an obtained polyolefin, to be reduced and (ii) a polyolefin to be continuously produced stably. A polyolefin producing system (1) includes: a cylindrical member which extends in a vertical direction; diameter decreasing members each of which is provided to the cylindrical member, each of the diameter decreasing members having (i) an inner diameter that decreases as the each of the diameter decreasing members extends downward and (ii) a gas inlet opening at a lower end of the each of the diameter decreasing members; spouted bed type olefin polymerization reaction regions (25) each of which is surrounded by (a) an inner surface of a corresponding one of the diameter decreasing members and (b) part of an inner surface of the cylindrical member which part extends upward from the corresponding one of the diameter decreasing members, each of the spouted bed type olefin polymerization reaction regions (25) being a region in which a spouted bed is formed, the number of the spouted bed type olefin polymerization reaction regions (25) being 3 or more; and at least one fluidized bed type olefin polymerization reaction region which is provided at a stage subsequent to the spouted bed type olefin polymerization reaction regions (25).

3 Claims, 3 Drawing Sheets

(51) Int. Cl.

| | |
|---|---|
| *B01J 19/24* | (2006.01) |
| *B01J 8/24* | (2006.01) |
| *B01J 8/18* | (2006.01) |
| *B01J 8/28* | (2006.01) |
| *B01J 8/34* | (2006.01) |
| *B01J 8/00* | (2006.01) |
| *B01J 8/26* | (2006.01) |
| *B01J 8/20* | (2006.01) |
| *B01J 8/38* | (2006.01) |
| *C08L 23/12* | (2006.01) |
| *C08L 23/14* | (2006.01) |

(52) U.S. Cl.
CPC ............... *B01J 8/245* (2013.01); *B01J 8/26* (2013.01); *B01J 8/28* (2013.01); *B01J 8/34* (2013.01); *B01J 8/382* (2013.01); *C08F 210/06* (2013.01); *C08L 23/12* (2013.01); *C08L 23/14* (2013.01); *B01J 2208/0084* (2013.01); *B01J 2208/00274* (2013.01); *B01J 2208/00902* (2013.01); *B01J 2219/185* (2013.01); *B01J 2219/19* (2013.01); *B01J 2231/122* (2013.01); *C08L 2205/02* (2013.01); *C08L 2207/02* (2013.01)

(56) References Cited

U.S. PATENT DOCUMENTS

| | | |
|---|---|---|
| 2,890,106 A | 6/1959 | Heath |
| 2,936,303 A | 5/1960 | Goins |
| 3,079,222 A | 2/1963 | Reeve |
| 3,242,586 A | 3/1966 | Peterson |
| 3,262,922 A | 7/1966 | Payne |
| 3,495,952 A | 2/1970 | Ulbrecht |
| 3,644,583 A | 2/1972 | Scoggin |
| 3,652,527 A | 3/1972 | Trieschmann et al. |
| 3,719,029 A | 3/1973 | Suzukawa et al. |
| 3,770,714 A | 11/1973 | Dorschner et al. |
| 3,776,979 A | 12/1973 | Hill |
| 3,957,448 A | 5/1976 | Shepard et al. |
| 3,971,768 A | 7/1976 | Peters et al. |
| 4,129,701 A | 12/1978 | Jezl et al. |
| 4,337,722 A | 7/1982 | Debayeux et al. |
| 4,373,272 A | 2/1983 | Jones et al. |
| 4,404,083 A | 9/1983 | Vasalos |
| 4,419,330 A | 12/1983 | Ishihara et al. |
| 4,441,822 A | 4/1984 | Biswas et al. |
| 4,457,896 A | 7/1984 | Kono |
| 4,466,082 A | 8/1984 | Zoschak et al. |
| 4,518,750 A | 5/1985 | Govoni et al. |
| 4,533,367 A | 8/1985 | Hadzismajlovic |
| 4,640,339 A | 2/1987 | Klaren |
| 4,744,413 A | 5/1988 | Klaren et al. |
| 5,034,195 A | 7/1991 | Platz |
| 5,213,768 A | 5/1993 | Maurel et al. |
| 5,235,009 A | 8/1993 | Hogan |
| 5,245,093 A | 9/1993 | Ember |
| 5,536,378 A | 7/1996 | Gibson et al. |
| 5,674,308 A | 10/1997 | Meissner et al. |
| 5,676,201 A | 10/1997 | Klaren |
| 6,066,701 A | 5/2000 | Koveal et al. |
| 6,306,981 B1 | 10/2001 | Brown et al. |
| 6,441,108 B1 | 8/2002 | Haendeler et al. |
| 6,444,763 B1 | 9/2002 | Sagae et al. |
| 6,518,372 B1 | 2/2003 | Weickert |
| 6,689,845 B1 | 2/2004 | Govoni et al. |
| 7,601,303 B1 | 10/2009 | Karer et al. |
| 7,993,593 B2 * | 8/2011 | Sato ............ C08F 10/00 422/131 |
| 2006/0058474 A1 | 3/2006 | Covezzi et al. |
| 2006/0063896 A1 | 3/2006 | McElvain et al. |
| 2007/0217966 A1 | 9/2007 | Heino et al. |
| 2009/0148354 A1 | 6/2009 | Ogawa et al. |
| 2009/0149610 A1 | 6/2009 | Sato et al. |
| 2009/0149620 A1 | 6/2009 | Sato et al. |
| 2010/0036070 A1 | 2/2010 | Aso et al. |
| 2010/0069581 A1 | 3/2010 | Ogawa et al. |
| 2010/0311923 A1 | 12/2010 | Sato et al. |
| 2012/0264893 A1 | 10/2012 | Nakashima et al. |
| 2015/0141589 A1 | 5/2015 | Sato |
| 2015/0197583 A1 * | 7/2015 | Meka ............ C08F 10/06 524/451 |

FOREIGN PATENT DOCUMENTS

| | | |
|---|---|---|
| EP | 0241947 A2 | 10/1987 |
| EP | 0381364 A1 | 8/1990 |
| EP | 1484343 A1 | 12/2004 |
| GB | 845655 A | 8/1960 |
| GB | 954078 A | 4/1964 |
| GB | 1147273 A | 4/1969 |
| GB | 1233106 A | 5/1971 |
| GB | 1351624 A | 5/1974 |
| GB | 1587891 A | 4/1981 |
| GB | 2077628 A | 12/1981 |
| JP | 41-12916 A | 7/1966 |
| JP | 46-11670 A | 3/1971 |
| JP | 46-31969 A | 9/1971 |
| JP | 47-42379 A | 10/1972 |
| JP | 58-201802 A | 11/1983 |
| JP | 58-216735 A | 12/1983 |
| JP | 59-42039 A | 3/1984 |
| JP | 59-21321 B2 | 5/1984 |
| JP | 59-126406 A | 7/1984 |
| JP | 2-233708 A | 9/1990 |
| JP | 2675919 B2 | 11/1997 |
| JP | 2000-302807 A | 10/2000 |
| JP | 2002-515516 A | 5/2002 |
| JP | 2002-520426 A | 7/2002 |
| JP | 2002-537420 A | 11/2002 |
| JP | 3352059 B2 | 12/2002 |
| JP | 2003-277412 A | 10/2003 |
| JP | 2005-290102 A | 10/2005 |
| JP | 2006-502263 A | 1/2006 |
| JP | 2009-161735 A | 7/2009 |
| JP | 2010-59413 A | 8/2010 |
| JP | 2011-116970 A | 6/2011 |
| WO | WO 93/24533 A1 | 12/1993 |
| WO | WO 99/59712 A1 | 11/1999 |
| WO | WO 02/40547 A1 | 5/2002 |
| WO | WO 2007/071527 A1 | 6/2007 |

OTHER PUBLICATIONS

Australian Search Report, dated Apr. 22, 2009, for Australian Application No. 200809160-5.

Hatate et al., "Flow Characteristics of Draft Tube Spouted Bed and its Application," Journal of the Society of Powder Technology, vol. 34, No. 5, May 1997, pp. 343-360 (19 pages total), with a partial English translation.

Hattori et al., "Minimum Spoutable Gas Flow Rate in Side-Outlet Spouted Bed with Inner Draft-Tube," Journal of Chemical Engineering of Japan, vol. 14, No. 6, 1981, presented at the 46th Annual Meeting of Chem. Engrs., Japan, Apr. 3, 1981, pp. 462-466.

Ishikura et al., "Hydrodynamics of a Spouted Bed with a Porous Draft Tube," Kagaku Kougaku Ronbunshu, vol. 22, No. 3, 1996, pp. 615-621 (8 pages total), with a partial English translation.

Ishikura et al., "Hydrodynamics of Modified Spouted Beds for Binary Mixtures of Particles—Effect of the Aeration Gas Flow Rate from Side Distributor," Fukuoka University Journal of Engineering, No. 58, Mar. 1997, pp. 155-165 (6 pages total), with a partial English translation.

Ishikura, "Regime Map of Binary Particle Mixture in a Spout-Fluid Bed," Kagaku Kougaku Ronbunshu, vol. 19, No. 6, 1993, pp. 1189-1192, with a partial English translation.

Mathur et al., "Spouted Beds," Academic Press, 1974, pp. 114-116 and 279-280 (6 pages total).

Perry et al., "Solids-Drying Equipement," Perry's Chemical Engineers' Handbook, McGraw-Hill, 1997, pp. 12-75 and 12-76 (4 pages total).

(56) References Cited

OTHER PUBLICATIONS

Singapore Search Report, dated Nov. 10, 2010, for Singapore Patent Application No. 201004966-6.
Society of Power Technology, "Terminology Dictionary of Powder Technology," 2nd Edition, Published by Nikkan Kogyo Shimbunsha, Tokyo, Japan, Mar. 30, 2000, pp. 321 (5 pages total), with a partial English translation.
Takeda et al., "Modified Types of Spouted Beds—With the gas Outlet Located in the Side Wall Surrounding the Annular Dense Bed," Journal of JSEE, The Society of Chemical Engineers, Japan, vol. 1, No. 2, 1975, pp. 149-154, with a partial English translation.
Takenaka et al., "Fluidity Characteristics of a Spouted Bed with a Cylinder to Cone-shaped Perforated Draft Tubes," SCEJ 71st Annual Meeting, J123, 2006, 2 pages, with an English translation.
U.S. Notice of Allowance, dated Apr. 18, 2011, for U.S. Appl. No. 12/332,102.
U.S. Notice of Allowance, dated Mar. 18, 2011, for U.S. Appl. No. 12/332,112.
U.S. Office Action, dated Dec. 7, 2010, for U.S. Appl. No. 12/332,065.
U.S. Office Action, dated Jun. 15, 2010, for U.S. Appl. No. 12/332,055.
U.S. Office Action, dated Jun. 3, 2010, for U.S. Appl. No. 12/332,112.
U.S. Office Action, dated Mar. 16, 2011, for U.S. Appl. No. 12/332,102.
U.S. Office Action, dated May 26, 2011, U.S. Appl. No. 12/332,112.
U.S. Office Action, dated May 6, 2011, for U.S. Appl. No. 12/332,065.
U.S. Office Action, dated Nov. 12, 2010, for U.S. Appl. No. 12/332,112.
Weickert et al., "New Reactor Concepts for the Gas-Phase Polymerization of Olefins," Chemie Ingenieur Technik, vol. 77, No. 8, 2005, pp. 977-978 (1 page total).
Yokokawa, "Fluidizing Characteristics of Fluidized Bed and Spouted Bed, and their Application," Journal of the Society of Powder Technology, vol. 21, No. 11, Nov. 1984, pp. 715-723 (11 pages total), with a partial English translation.
Singapore Search Report, dated Apr. 1, 2009, Singapore Application No. 200809159-7.
Singapore Search Report, dated Mar. 23, 2009, for Singapore Application No. 200809158-9.
Singapore Search Report, dated Mar. 24, 2009, for Singapore Application No. 200809157-1.
Singapore Search Report, dated Mar. 27, 2009, for Singapore Application No. 200809161-3.

\* cited by examiner

SYSTEM FOR PRODUCING POLYOLEFIN, METHOD OF PRODUCING POLYOLEFIN, AND METHOD OF PRODUCING HETEROPHASIC PROPYLENE POLYMER MATERIAL

This Nonprovisional application claims priority under 35 U.S.C. § 119 on Patent Application No. 2016-153179 filed in Japan on Aug. 3, 2016, the entire contents of which are hereby incorporated by reference.

TECHNICAL FIELD

The present invention relates to a system for producing a polyolefin, a method of producing a polyolefin, and a method of producing a heterophasic propylene polymer material.

BACKGROUND ART

Patent literature 1 discloses an olefin polymerization reactor, a polyolefin producing system, and a polyolefin producing method, each of which, despite having a simple configuration, allows residence time distribution to be narrower.

Patent Literature 2 discloses a method of producing a propylene-based polymer having a crystalline propylene-based polymer segment and an amorphous propylene-based polymer segment, which method allows obtainment of polymer particles that are less adhesive.

Patent Literature 3 discloses a method of producing an olefin polymer, which method allows an efficient decrease in hydrogen concentration, thereby allowing production of an olefin polymer having a higher molecular weight.

CITATION LIST

Patent Literature

[Patent Literature 1]
Japanese Patent Application Publication Tokukai No. 2009-161735 (published on Jul. 23, 2009)
[Patent Literature 2]
Japanese Patent Application Publication Tokukai No. 2005-290102 (published on Oct. 20, 2005)
[Patent Literature 3]
Japanese Patent Application Publication Tokukai No. 2010-59413 (published on Mar. 18, 2010)

SUMMARY OF INVENTION

Technical Problem

By the way, in recent years, there has been a demand for a further reduction in a defect (gel) to be contained in a molded product made of a polyolefin. Moreover, in recent years, there have been (i) a demand for a propylene polymer material containing a large amount of comonomers and (ii) a demand for a method of continuously producing such a propylene polymer material more stably.

The present invention has been made in view of the above demands, and an object of the present invention is to provide a system for producing a polyolefin, a method of producing a polyolefin, and a method of producing a heterophasic propylene polymer material, each of which allows (i) a gel, to be contained in a molded product that is made of an obtained polyolefin, to be reduced and (ii) a polyolefin to be continuously produced stably.

Solution to Problem

In order to attain the object, the present invention provides the following.

A system for producing a polyolefin, the system including: a cylindrical member which extends in a vertical direction; diameter decreasing members each of which is provided to the cylindrical member, each of the diameter decreasing members having (i) an inner diameter that decreases as the each of the diameter decreasing members extends downward and (ii) a gas inlet opening at a lower end of the each of the diameter decreasing members; spouted bed type olefin polymerization reaction regions each of which is surrounded by (a) an inner surface of a corresponding one of the diameter decreasing members and (b) part of an inner surface of the cylindrical member which part extends upward from the corresponding one of the diameter decreasing members, each of the spouted bed type olefin polymerization reaction regions being a region in which a spouted bed is formed, the number of the spouted bed type olefin polymerization reaction regions being 3 or more; and at least one fluidized bed type olefin polymerization reaction region which is provided at a stage subsequent to the spouted bed type olefin polymerization reaction regions.

A method of producing a polyolefin, the method including the step of: polymerizing an olefin with use of the system.

A method of producing a heterophasic propylene polymer material with use of the system, the method including the steps of: (1) polymerizing an olefin in the spouted bed type olefin polymerization reaction regions so as to obtain a propylene homopolymer component (I-1), a propylene copolymer component (I-2), or both of the propylene homopolymer component (I-1) and the propylene copolymer component (I-2); and (2) polymerizing an olefin in the at least one fluidized bed type olefin polymerization reaction region in the presence of the propylene homopolymer component (I-1), the propylene copolymer component (I-2), or both of the propylene homopolymer component (I-1) and the propylene copolymer component (I-2), each obtained in the step (1), so as to obtain a heterophasic propylene polymer material.

The heterophasic propylene polymer material is:
a propylene polymer material containing the propylene homopolymer component (I-1) and a propylene copolymer component (II);
a propylene polymer material containing the propylene copolymer component (I-2) and the propylene copolymer component (II); or
a propylene polymer material containing the propylene homopolymer component (I-1), the propylene copolymer component (I-2), and the propylene copolymer component (II).

The propylene copolymer component (I-2) is a copolymer component containing a propylene-based monomer unit and a monomer unit which is based on at least one kind of olefin selected from the group consisting of ethylene and α-olefins having 4 to 12 carbon atoms; and assuming that a total weight of the propylene copolymer component (I-2) is 100% by weight, the propylene copolymer component (I-2) contains the monomer unit, which is based on the at least one kind of olefin selected from the group consisting of the ethylene and the α-olefins having 4 to 12 carbon atoms, in an amount of not less than 0.01% by weight and less than 15% by weight.

The propylene copolymer component (II) is a copolymer component containing (i) a monomer unit which is based on at least one kind of olefin selected from the group consisting of ethylene and α-olefins having 4 to 12 carbon atoms and (ii) a propylene-based monomer unit; and assuming that a total weight of the propylene copolymer component (II) is 100% by weight, the propylene copolymer component (II) contains the monomer unit, which is based on the at least one kind of olefin selected from the group consisting of the ethylene and the α-olefins having 4 to 12 carbon atoms, in an amount of not less than 15% by weight and not more than 80% by weight.

Advantageous Effects of Invention

According to the present invention, it is possible to provide a system for producing a polyolefin, a method of producing a polyolefin, and a method of producing a heterophasic propylene polymer material, each of which allows (i) a gel, to be contained in a molded product that is made of an obtained polyolefin, to be reduced and (ii) a polyolefin to be continuously produced stably.

DESCRIPTION OF EMBODIMENTS

The following description will discuss an embodiment of the present invention in detail.

<System for Producing Polyolefin>

As used herein, a "system for producing a polyolefin" means a series of devices which are for producing a polyolefin and which include at least one polymerization reactor for polymerizing an olefin. A system for producing a polyolefin (hereinafter, referred to as a polyolefin producing system) in accordance with the present embodiment includes: a cylindrical member which extends in a vertical direction; diameter decreasing members each of which is provided to the cylindrical member, each of the diameter decreasing members having (i) an inner diameter that decreases as the each of the diameter decreasing members extends downward and (ii) a gas inlet opening at a lower end of the each of the diameter decreasing members; spouted bed type olefin polymerization reaction regions each of which is surrounded by (a) an inner surface of a corresponding one of the diameter decreasing members and (b) part of an inner surface of the cylindrical member which part extends upward from the corresponding one of the diameter decreasing members, each of the spouted bed type olefin polymerization reaction regions being a region in which a spouted bed is formed, the number of the spouted bed type olefin polymerization reaction regions being 3 or more; and at least one fluidized bed type olefin polymerization reaction region which is provided at a stage subsequent to the spouted bed type olefin polymerization reaction regions. Note, here, that a fluidized bed type olefin polymerization reaction region means a polymerization region in which a polymerization reaction occurs in a state where a fluidized bed is formed. More specifically, the fluidized bed type olefin polymerization reaction region means a polymerization region which includes (i) a cylindrical member that extends in a vertical direction and (ii) a dispersion plate that is provided in a horizontal direction inside the cylindrical member and which is surrounded by part of an inner surface of the cylindrical member which part extends upwards from an upper part of the dispersion plate. In such a polymerization region, a polymerization reaction occurs in a state where a fluidized bed is formed. Note that an example configuration of the polyolefin producing system in accordance with the present embodiment will be described below with reference to FIGS. 1 through 3, but the polyolefin producing system in accordance with the present invention is not limited to such a configuration.

Figure 1:
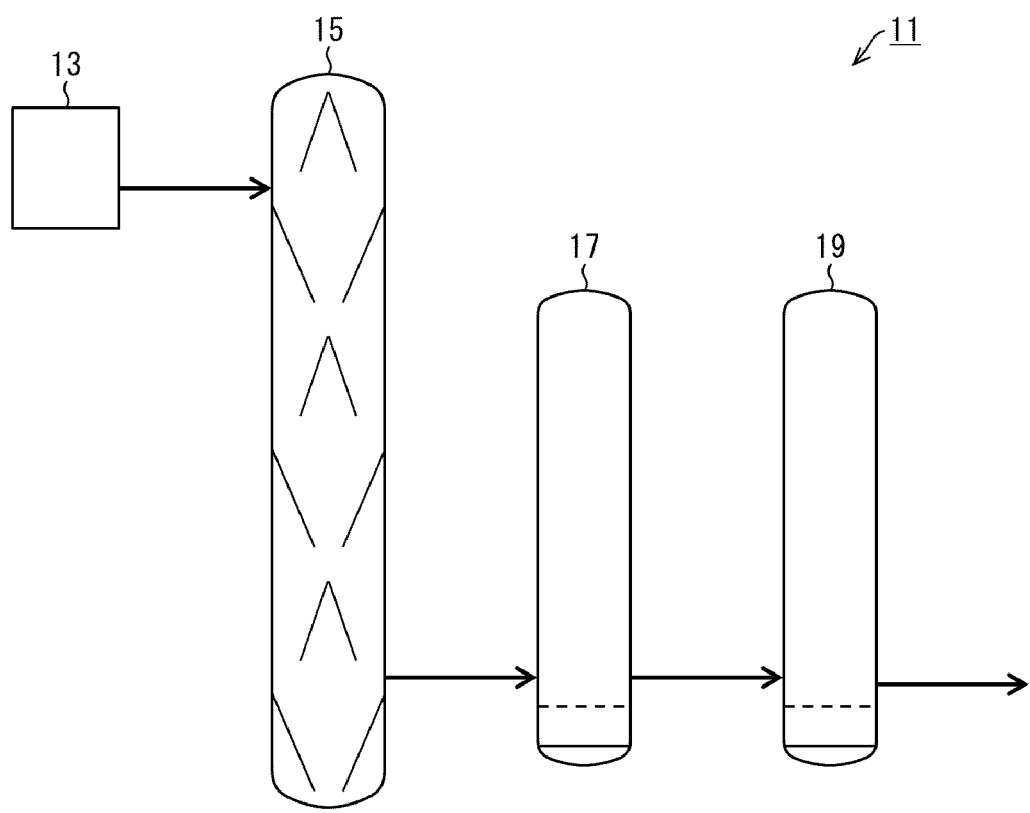
FIG. 1 is a view schematically illustrating a configuration of a system, for producing a polyolefin, in accordance with the present embodiment.
Figure 2:
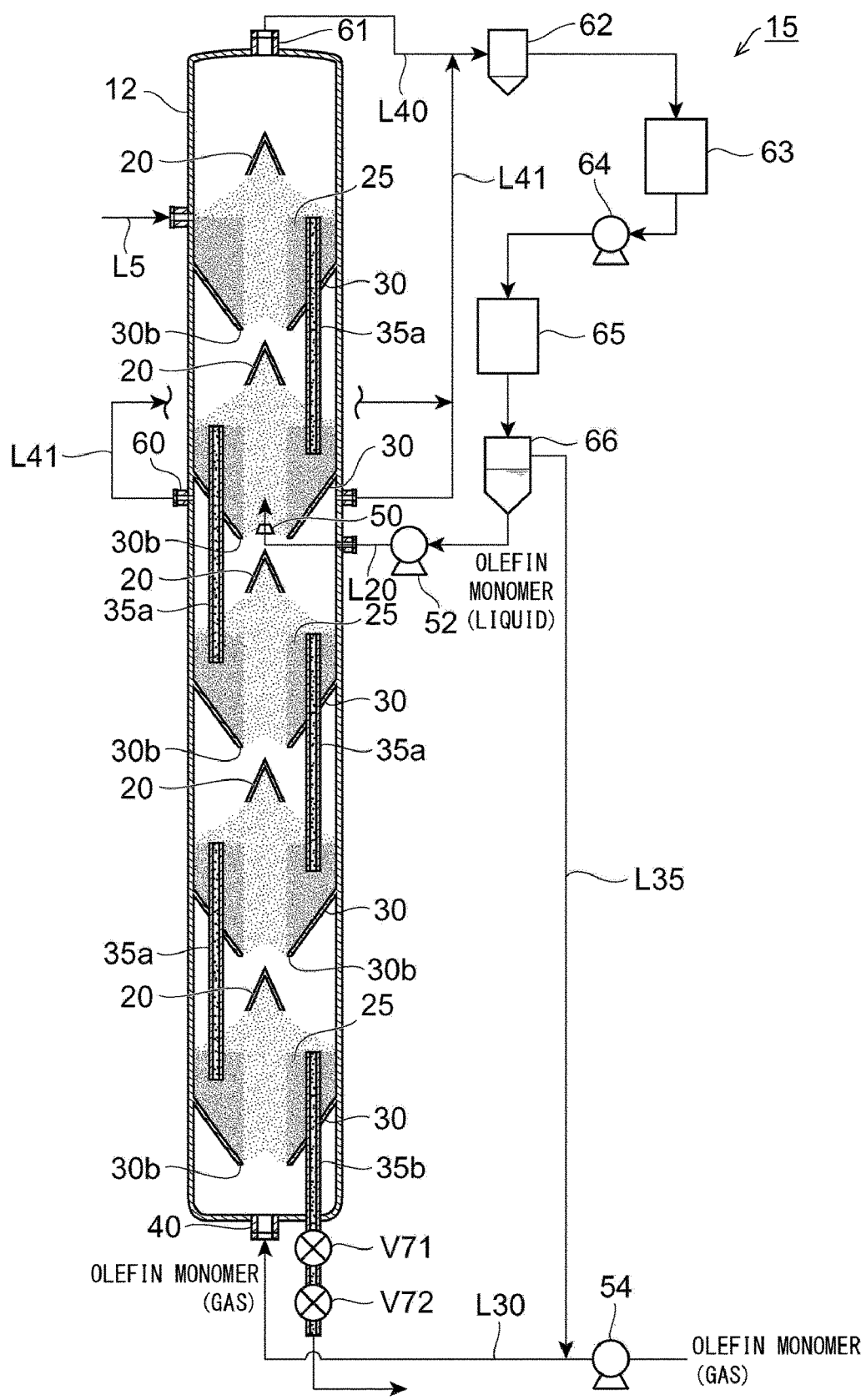
FIG. 2 is an enlarged cross-sectional view schematically illustrating a multistage gaseous phase polymerization reactor illustrated in FIG. 1.
Figure 3:
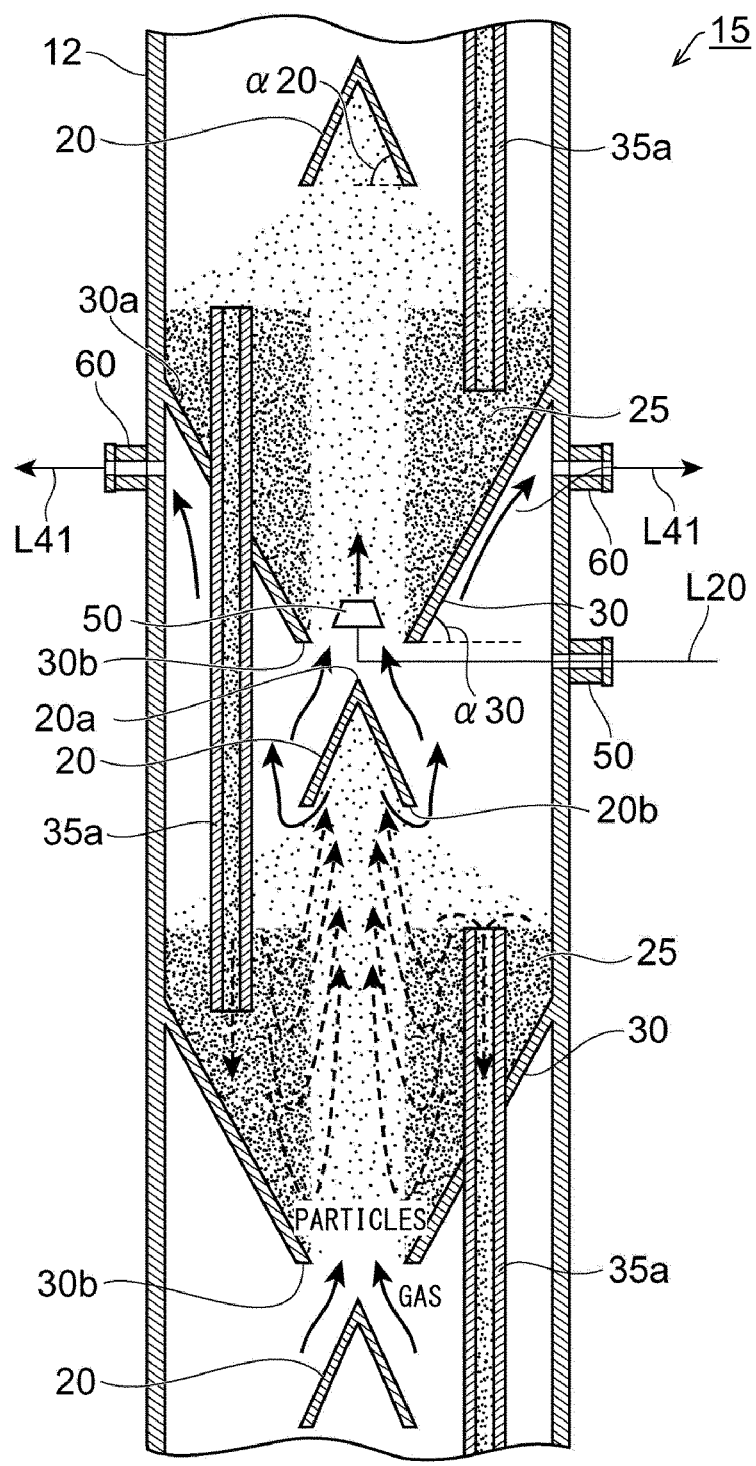
FIG. 3 is an enlarged partial cross-sectional view schematically illustrating the multistage gaseous phase polymerization reactor illustrated in FIG. 2.

FIG. 1 is a view schematically illustrating a configuration of a polyolefin producing system in accordance with the present embodiment. FIG. 2 is an enlarged cross-sectional view schematically illustrating a multistage gaseous phase polymerization reactor illustrated in FIG. 1. FIG. 3 is an enlarged partial cross-sectional view schematically illustrating the multistage gaseous phase polymerization reactor illustrated in FIG. 2.

As illustrated in FIG. 1, a polyolefin producing system 11 mainly includes (i) an olefin prepolymerization reactor 13, (ii) a multistage gaseous phase polymerization reactor 15 which is provided at a stage subsequent to the olefin prepolymerization reactor 13 and which is connected to the olefin prepolymerization reactor 13, (iii) a first fluidized bed type olefin polymerization reactor 17 which is provided at a stage subsequent to the multistage gaseous phase polymerization reactor 15 and which is connected to the multistage gaseous phase polymerization reactor 15, and (iv) a second fluidized bed type olefin polymerization reactor 19 which is provided at a stage subsequent to the first fluidized bed type olefin polymerization reactor 17 and which is connected to the first fluidized bed type olefin polymerization reactor 17. Note that, for convenience, FIG. 1 illustrates the olefin prepolymerization reactor 13, the multistage gaseous phase polymerization reactor 15, the first fluidized bed type olefin polymerization reactor 17, and the second fluidized bed type olefin polymerization reactor 19 in a state where each of them is separated from the other reactor(s). Note also that, as used herein, the phrase "provided at a stage subsequent to" means being provided on a downstream side of the polyolefin producing system 11. Specifically, the first fluidized bed type olefin polymerization reactor 17 which is located on a downstream side of the multistage gaseous phase polymerization reactor 15 (see FIG. 1) is a polymerization reactor which is provided at a stage subsequent to the multistage gaseous phase polymerization reactor 15. Each of those reactors will be described below in detail.

(Olefin Prepolymerization Reactor 13)

The olefin prepolymerization reactor 13 is a reactor in which an olefin is polymerized in the presence of an olefin polymerization catalyst so as to form polyolefin particles.

Examples of the olefin prepolymerization reactor 13 encompass slurry polymerization reactors, bulk polymerization reactors, stirred tank type gaseous phase polymerization reactors, and fluidized bed type gaseous phase polymerization reactors. Note that the olefin prepolymerization reactor 13 is not limited to any particular one. Each of those reactors can be used solely. Alternatively, two or more reactors of an identical kind can be used in combination. Alternatively, two or more reactors of different kinds can be used in combination. Specific examples of the bulk polymerization reactors encompass publicly known polymerization reactors, such as a stirred tank type reactor and a loop type reactor, as disclosed in Japanese Examined Patent Application Publication Tokukosho No. 41-12916, Japanese Examined Patent Application Publication Tokukosho No. 46-11670, and Japanese Examined Patent Application Publication Tokukosho No. 47-42379. Note that bulk polymerization indicates the following polymerization. That substantially in the absence of an inert solvent such as an aliphatic hydrocarbon (e.g., propane, butane, isobutene, pentane, hexane, heptane, or octane) or an alicyclic hydrocarbon (e.g., cyclopentane or cyclohexane), an olefin monomer, such as propylene or butane, which serves as an olefin polymerization catalyst is dispersed in a polymerization solvent and is subjected to polymerization in a state where a polymer to be obtained is not to be dissolved in the polymerization solvent. This polymerization is carried out at a temperature and under a pressure which temperature and pressure cause (i) the polymerization solvent to be maintained in a liquid state and (ii) the polymer, to be obtained, not to be dissolved in the polymerization solvent. Such a polymerization temperature is generally 30° C. to 100° C., preferably 40° C. to 80° C. Such a polymerization pressure is generally a normal pressure to 10 MPaG, preferably 0.5 MPaG to 5 MPaG.

(Multistage Gaseous Phase Polymerization Reactor 15)

The multistage gaseous phase polymerization reactor 15 in accordance with the present embodiment is a reactor in which polyolefin particles obtained in the olefin prepolymerization reactor 13 are polymerized substantially in a gaseous phase state.

As illustrated in FIG. 2, the multistage gaseous phase polymerization reactor 15 mainly includes (i) a cylindrical member 12 which extends in a vertical direction, (ii) deflectors 20 which are provided inside the cylindrical member 12, and (iii) tubular baffles (diameter decreasing members) 30 which are provided inside the cylindrical member 12. Each of the tubular baffles 30, each of which is provided to the cylindrical member 12, has (i) an inner diameter which decreases as the each of the tubular baffles 30 extends downward and (ii) a gas inlet opening 30b at a lower end of the each of the tubular baffles 30. Note that, as used herein, each of spouted bed type olefin polymerization reaction regions 25 (hereinafter, also merely referred to as "reaction regions 25") indicates a region surrounded by (i) an inner surface (upper surface) of a corresponding one of the tubular baffles 30 and (ii) part of an inner surface of the cylindrical member 12 which part extends upward from the corresponding one of the tubular baffles 30. More specifically, each of the spouted bed type olefin polymerization reaction regions 25 is a region surrounded by (i) the inner surface (upper surface) of the corresponding one of the tubular baffles 30 and (ii) part of the inner surface of the cylindrical member 12 which part extends from the corresponding one of the tubular baffles 30 to a corresponding one of the deflectors 20. Note that, as used herein, the phrase "provided to the cylindrical member" indicates not only a configuration in which, as described above, a baffle is provided inside a cylindrical member, but also a configuration in which the baffle is provided so as to be connected to the cylindrical member. In other words, in the present embodiment, the baffle can be provided inside the cylindrical member as described above or can be alternatively connected to a lower end of the cylindrical member.

In the present embodiment, in order that a plurality of spouted bed type olefin polymerization reaction regions are formed, the multistage gaseous phase polymerization reactor 15 includes a plurality of deflectors 20, which are provided inside the cylindrical member 12, and a plurality of tubular baffles 30, which are provided inside the cylindrical member 12. The plurality of deflectors 20 and the plurality of tubular baffles 30 are preferably alternately arranged in an axial direction of the cylindrical member 12. Note that, in this case, each of the plurality of spouted bed type olefin polymerization reaction regions 25 indicates a region surrounded by (i) an inner surface of a corresponding one of the plurality of tubular baffles 30 and (ii) part of an inner surface of the cylindrical member 12 which part extends from the corresponding one of the plurality of tubular baffles 30 to a corresponding one of the plurality of deflectors 20.

Note that the multistage gaseous phase polymerization reactor 15 can be arranged such that not only the spouted bed type olefin polymerization reaction regions 25 but also a fluidized bed type olefin polymerization reaction region (not illustrated) is formed. Specifically, for example, a dispersion plate (not illustrated) is provided inside the cylindrical member 12 so that the fluidized bed type olefin polymerization reaction region (not illustrated) extending upward from the dispersion plate is formed. This causes the cylindrical member 12 to have therein the spouted bed type olefin polymerization reaction regions 25 and the fluidized bed type olefin polymerization reaction region. Note also that the multistage gaseous phase polymerization reactor 15 can be arranged such that the spouted bed type olefin polymerization reaction regions 25 are combined with fluidized bed type olefin polymerization reaction regions, by combining the foregoing cylindrical member 12 with the cylindrical member 12 in which dispersion plates are provided.

In view of stabilization of a spouted bed, the inner diameter of the cylindrical member 12 is preferably not more than 5 m, more preferably not more than 3.5 m.

According to the multistage gaseous phase polymerization reactor 15, the number of the spouted bed type olefin polymerization reaction regions 25 is three or more, preferably four or more, more preferably five or more, in view of suppression of a gel.

In a reaction region 25, a spouted bed of the polyolefin particles is formed by causing a gas, containing an olefin, to flow upward at a high speed through a gas inlet opening formed at a lower end 30b of a tubular baffle 30. A deflector 20 functions to prevent such spouted polyolefin particles from scattering. This makes it possible to shorten a freeboard zone and accordingly achieve high volume efficiency.

The deflector 20 has a conical shape such that (i) an upper end 20a of the deflector 20 is closed and (ii) an outer diameter of the deflector 20 increases as the deflector 20 extends downward. A lower end 20b of the deflector 20 is apart from an inner wall of the cylindrical member 12. This causes the polyolefin particles which are blown upward to (i) strike against an inner surface of the deflector 20 and (ii) be incorporated into an annular structure of the spouted bed. On the other hand, the gas passes between the lower end 20b of the deflector 20 and the inner wall of the cylindrical member 12, and then flows upward.

The tubular baffle 30 has a tapered cylindrical shape such that an inner diameter of the tubular baffle 30 decreases as the tubular baffle 30 extends downward. An upper end 30a of the tubular baffle 30 is in contact with the inner wall of the cylindrical member 12. This causes the gas to flow upward through the gas inlet opening, having a circular shape, formed at the lower end 30b of the tubular baffle 30, but not to flow between the upper end 30a of the tubular baffle 30 and the cylindrical member 12.

The polyolefin particles can be transferred between adjacent reaction regions 25 through, for example, a downcomer.

A downcomer 35a is provided to each of upper tubular baffles 30, which are provided inside an upper part of the cylindrical member 12, such that the downcomer 35a penetrates the each of the upper tubular baffles 30. A downcomer 35b is provided to a lowermost tubular baffle 30. The downcomer 35a causes the polyolefin particles to fall from an upper one of the adjacent reaction regions 25 to a lower one of the adjacent reaction regions 25. The downcomer 35b causes the polyolefin particles to be removed from a lowermost reaction region 25 and then discharged outside the cylindrical member 12. The downcomer 35b is provided with valves V71 and V72 which are arranged in series. By successively opening and closing the valves V71 and V72, it is possible to subject the polyolefin particles to a subsequent step.

In order to form a stable spouted bed in the reaction region 25, it is preferable that the tubular baffle 30 satisfy the following conditions. That is, a ratio ($d_A/d_B$) of a diameter $d_A$ of the gas inlet opening formed at the lower end 30b of the tubular baffle 30 to an inner diameter $d_B$ of the cylindrical member 12 is preferably not more than 0.35. Furthermore, an angle of inclination $\alpha 30$ of the tubular baffle 30 in FIG. 3, that is, an angle formed between an inner surface of the tubular baffle 30 and a horizontal plane is preferably equal to or greater than an angle of repose of the polyolefin particles present inside the cylindrical member 12. The angle of inclination $\alpha 30$ is more preferably equal to or greater than the angle of repose, and further equal to or greater an angle at which all of the polyolefin particles can be spontaneously discharged by gravity. This allows smooth downward movement of the polyolefin particles.

An angle of inclination $\alpha 20$ of the deflector 20 in FIG. 3, that is, an angle formed between an outer surface (lower surface) of the deflector 20 and the horizontal plane is also preferably equal to or greater than the angle of repose of the polyolefin particles present inside the cylindrical member 12. This makes it possible to sufficiently prevent the polyolefin particles from adhering to the deflector 20.

The angle of repose of the polyolefin particles is approximately, for example, 35° to 50°. The angle of inclination $\alpha 30$ and the angle of inclination $\alpha 20$ are each preferably not less than 55°.

Note that the deflector 20 and the tubular baffle 30 are each fixed to the cylindrical member 12 by a support (not illustrated). Such a support hardly affects a flow of the gas or a flow of the polyolefin particles. The cylindrical member 12, the deflector 20, and the tubular baffle 30 can be each made of, for example, a carbon steel, SUS304, SUS316L, or the like. Note that the phrase "SUS" indicates a stainless steel standard specified in Japanese Industrial Standards (JIS). In a case where a catalyst which contains a corrosive component (for example, a halogen component such as chlorine) in a large amount is used, it is preferable to use SUS316L.

As illustrated in FIG. 2, a gas supply nozzle 40 is provided to a lower part of the cylindrical member 12. A gaseous olefin monomer is supplied to the lower part of the cylindrical member 12 via a line L30 and a compressor 54. A gas discharge nozzle 61 is provided to the upper part of the cylindrical member 12. The gas which has flowed up inside the cylindrical member 12 is discharged outside the cylindrical member 12 via a line L40, and the polyolefin particles which are entrained in the gas are discharged by a cyclone 62 provided as necessary. After the gas is subjected to processes carried out by a heat exchanger 63, a compressor 64, a heat exchanger 65, and a gas-liquid separator 66, the gas is introduced into the line L30 via a line L35 and is then reused. Note that, in addition to the gas supply nozzle 40, a discharge nozzle (not illustrated) which allows the polyolefin particles to be discharged at an end of operation can be provided to the lower part of the cylindrical member 12. Note also that, for the purpose of a reduction in amount of a powder remaining in the multistage gaseous phase polymerization reactor 15 at the end of the operation, an interior member (not illustrated) having an inverted conical shape can be provided at a location in the lower part of the cylindrical member 12 at which location the interior member does not block the flow of the gas.

The cylindrical member 12 is also provided with a liquid supply nozzle 50 through which a liquefied olefin monomer, having been separated by the gas-liquid separator 66, is supplied to a given reaction region 25 from outside the cylindrical member 12. More specifically, as illustrated in FIG. 3, the liquid supply nozzle 50 is provided near the gas inlet opening of the second tubular baffle 30 from the top so that the liquefied olefin monomer is injected toward a spout. A pump and a line L20, each of which is for supplying the liquefied olefin monomer as necessary, are connected to the liquid supply nozzle 50. In FIG. 3, the liquid supply nozzle 50 is provided near the gas inlet opening of the second tubular baffle 30 from the top. However, a location of the liquid supply nozzle 50 is not limited to such a location. The liquid supply nozzle 50 can be provided, for example, near a lower end of the second deflector 20 from the top. Alternatively, the liquid supply nozzle 50 can be provided so as to penetrate a side surface of the second tubular baffle 30 from the top so that the liquefied olefin monomer can be supplied to an inner surface of the second tubular baffle 30 from the top.

A plurality of gas discharge nozzles 60 can be further provided to part of the cylindrical member 12 which part faces an outer surface of a given tubular baffle 30. More specifically, as illustrated in FIG. 3, the plurality of gas discharge nozzles 60 can be provided to part of the cylindrical member 12 which part faces an outer surface of the second tubular baffle 30 from the top. Each of the plurality of gas discharge nozzles 60 is connected to the line L40 via a line L41. An amount of the gas discharged through each of the plurality of gas discharge nozzles 60 is controlled with use of a valve or the like so that a total amount of the gas discharged through the plurality of gas discharge nozzles 60 is substantially equal to an amount of a gas which is obtained by vaporization of the liquefied olefin monomer supplied through the liquid supply nozzle 50. Therefore, even in a case where the liquefied olefin monomer is supplied into the cylindrical member 12 through the liquid supply nozzle 50, a superficial velocity of the gas in the cylindrical member 12 is kept substantially constant inside the upper part and the lower part of the cylindrical member 12.

Furthermore, a line L5 is connected to a location on the cylindrical member 12 which location is located above an uppermost tubular baffle 30. The polyolefin particles, which are formed in the olefin prepolymerization reactor 13 and which contain solid particles of an olefin polymerization catalyst, are supplied to an uppermost reaction region 25 via the line L5.

In this manner, according to the present embodiment, two-stage polymerization is achieved by the olefin prepolymerization reactor 13 and the multistage gaseous phase polymerization reactor 15. In the olefin prepolymerization reactor 13, the polyolefin particles are grown by polymerization of the olefin so that the polyolefin particles which are relatively large in particle size, that is, which have a particle size of preferably not less than 500 μm, more preferably not less than 700 μm, particularly preferably not less than 850 μm are obtained. This allows a more stable spouted bed to be formed in the multistage gaseous phase polymerization reactor 15.

Note that, in the present embodiment, the polyolefin producing system 11 includes the olefin prepolymerization reactor 13 (see FIG. 1). The polyolefin producing system in accordance with an embodiment of the present invention can be arranged so as not to include an olefin prepolymerization reactor. In such a case, a prepolymerization catalyst or a solid catalyst is directly supplied to the multistage gaseous phase polymerization reactor 15 via the line L5, and the olefin is polymerized in the multistage gaseous phase polymerization reactor 15.

Note also that the polyolefin producing system in accordance with an embodiment of the present invention can be arranged such that a single multistage gaseous phase polymerization reactor 15 has, as described above, a plurality of spouted bed type olefin polymerization reaction regions 25 or can be alternatively arranged such that a plurality of gaseous phase polymerization reactors (cylinders) each having a single spouted bed type olefin polymerization reaction region are connected to each other.

(First Fluidized Bed Type Olefin Polymerization Reactor 17 and Second Fluidized Bed Type Olefin Polymerization Reactor 19)

Each of the first fluidized bed type olefin polymerization reactor 17 and the second fluidized bed type olefin polymerization reactor 19 in accordance with the present embodiment (see FIG. 1) is a reactor in which an olefin monomer in a gaseous phase state is polymerized while an olefin polymerization catalyst and a polyolefin (hereinafter, also be referred to as an olefin polymer) are being maintained in a fluidized state in the olefin monomer, serving as a medium, by mainly a flow of the olefin monomer.

In the present embodiment, an auxiliary stirring device (not illustrated) can be provided to each of the first fluidized bed type olefin polymerization reactor 17 and the second fluidized bed type olefin polymerization reactor 19 so as to advance fluidization of the olefin polymerization catalyst and the polyolefin.

A polymerization temperature in each of the first fluidized bed type olefin polymerization reactor 17 and the second fluidized bed type olefin polymerization reactor 19 is generally 0° C. to 120° C., preferably 20° C. to 100° C., more preferably 40° C. to 100° C. A polymerization pressure in each of the first fluidized bed type olefin polymerization reactor 17 and the second fluidized bed type olefin polymerization reactor 19 only needs to fall within a range in which an olefin can be present as a gaseous phase in the each of the first fluidized bed type olefin polymerization reactor 17 and the second fluidized bed type olefin polymerization reactor 19, and is generally a normal pressure to 10 MPaG, preferably 0.2 MPaG to 8 MPaG, more preferably 0.5 MPaG to 5 MPaG.

Note that the present embodiment has described the polyolefin producing system 11 in which the first fluidized bed type olefin polymerization reactor 17 and the second fluidized bed type olefin polymerization reactor 19 are provided at respective stages subsequent to the multistage gaseous phase polymerization reactor 15, that is, two or more fluidized bed type olefin polymerization reaction regions are provided at respective stages subsequent to the spouted bed type olefin polymerization reaction regions 25. However, according to the polyolefin producing system in accordance with an embodiment of the present invention, the number of fluidized bed type olefin polymerization reaction regions provided at respective stages subsequent to the spouted bed type olefin polymerization reaction regions 25 is not limited to any particular number. Note also that, in view of stable production of a highly adhesive polyolefin such as a propylene polymer material containing a comonomer in a large amount, it is preferable that a fluidized bed type olefin polymerization reaction region be provided at the last stage. However, the polyolefin producing system in accordance with an embodiment of the present invention is not limited to such a configuration. Note that the phrase "last stage" means, in a polyolefin producing system, a region in which the last polymerization is carried out, out of a plurality of polymerization reaction regions in each of which polymerization for obtainment of a polyolefin is carried out. That is, a region in which polymerization of an olefin is carried out does not exist at a stage subsequent to the last stage.

For example, in production of a heterophasic propylene polymer material (later described in detail), a propylene copolymer component different in polymer composition is stably obtained by altering a composition of an olefin gas when a highly adhesive propylene copolymer component (II) is obtained by polymerization. In view of this, it is preferable that two or more fluidized bed type olefin polymerization reaction regions be provided at respective stages subsequent to the spouted bed type olefin polymerization reaction regions 25, by providing two or more fluidized bed type olefin polymerization reactors at respective stages subsequent to the multistage gaseous phase polymerization reactor 15.

In such a case, how to connect two or more fluidized bed type olefin prepolymerization reactors is not limited to any particular way. Therefore, for example, a discharge pipe (not illustrated) is provided so that an inlet of the discharge pipe is located in a fluidized bed in one of the two or more fluidized bed type olefin polymerization reactors, and a gas containing an olefin is transferred to the other one/another one of the two or more fluidized bed type olefin polymerization reactors. In this case, an outlet (not illustrated) of the discharge pipe can be located in or above a fluidized bed in the other one/another one of the two or more fluidized bed type olefin polymerization reactors.

Note that the polyolefin producing system can be configured so as to include a single reactor which includes (i) a single cylindrical member and (ii) a plurality of diameter decreasing members which are provided inside the single cylindrical member. Alternatively, the polyolefin producing system can be configured so as to include a plurality of reactors each of which includes (i) a single cylindrical member and (ii) a single diameter decreasing member which is provided inside the single cylindrical member. Alternatively, the polyolefin producing system can have the above-described configurations in combination.

Next, a method of producing a polyolefin by polymerizing an olefin with use of the polyolefin producing system 11 in accordance with the present embodiment will be described below with reference to FIG. 1 again.

<Method of Producing Polyolefin>

According to the method of producing a polyolefin in accordance with the present embodiment (hereinafter, also merely referred to as a "polyolefin producing method"), a polyolefin is produced by polymerizing an olefin with use of the polyolefin producing system 11.

A kind of the olefin used to produce the polyolefin in accordance with the present embodiment is not limited to any particular kind. However, the olefin is preferably an α-olefin having 1 to 12 carbon atom(s). Examples of such an olefin encompass ethylene, propylene, 1-butene, 1-hexene, and 4-methyl-1-pentene. Out of those olefins, ethylene, propylene, or 1-butene is preferable.

A kind of the polyolefin in accordance with the present embodiment is not limited to any particular kind. However, the polyolefin is preferably a polyolefin containing a monomer unit based on at least one kind of olefin selected from the group consisting of α-olefins having 1 to 12 carbon atom(s). The polyolefin obtained in the present embodiment is more preferably a polyolefin containing a propylene-based monomer unit. Note, here, that the phrase "monomer unit" means a structural unit which is based on a monomer. Note that the polyolefin can be a homopolymer or can be alternatively a copolymer. The homopolymer is specifically a homopolymer containing a monomer unit based on one kind of olefin selected from the group consisting of α-olefins having 1 to 12 carbon atom(s). The copolymer is, for example, (i) a copolymer containing an ethylene-based monomer unit and a monomer unit which is based on at least one kind of olefin selected from the group consisting of α-olefins having 3 to 12 carbon atoms or (ii) a copolymer containing a propylene-based monomer unit and a monomer unit which is based on at least one kind of olefin selected from the group consisting of α-olefins having 4 to 12 carbon atoms. Examples of the copolymer containing an ethylene-based monomer unit and a monomer unit which is based on at least one kind of olefin selected from the group consisting of α-olefins having 3 to 12 carbon atoms encompass an ethylene-propylene copolymer, an ethylene-1-butene copolymer, an ethylene-1-hexene copolymer, and an ethylene-4-methyl-1-pentene copolymer. Examples of the copolymer containing a propylene-based monomer unit and a monomer unit which is based on at least one kind of olefin selected from the group consisting of α-olefins having 4 to 12 carbon atoms encompass a propylene-1-butene copolymer. In an embodiment of the present invention, the polyolefin can be a composition containing such a homopolymer and such a copolymer or can be alternatively a composition containing copolymers which are different from each other. In particular, in an embodiment of the present invention, the polyolefin is preferably a heterophasic propylene polymer material which is (i) a composition containing a homopolymer, containing a propylene-based monomer unit, and a copolymer, containing a propylene-based monomer unit, or (ii) a composition containing copolymers which are different from each other and each of which contains a propylene-based monomer unit.

In an embodiment of the present invention, out of those copolymers, the polyolefin is particularly preferably a propylene copolymer containing a propylene-based monomer unit. The propylene copolymer contains the propylene-based monomer unit in an amount of, for example, not less than 50% by weight and not more than 95% by weight, preferably not less than 70% by weight and not more than 95% by weight, more preferably not less than 75% by weight and not more than 90% by weight (note that a total weight of the propylene copolymer is regarded as 100% by weight).

The propylene copolymer contains a monomer unit, based on at least one kind of olefin selected from the group consisting of ethylene and α-olefins having 4 to 12 carbon atoms, in an amount of, for example, not less than 5% by weight and not more than 50% by weight, preferably not less than 5% by weight and not more than 30% by weight, more preferably not less than 10% by weight and not more than 25% by weight (note that the total weight of the propylene copolymer is regarded as 100% by weight).

[Detail of Method of Producing Polyolefin with Use of Polyolefin Producing System 11]

According to the polyolefin producing method in accordance with the present embodiment, polyolefin particles are polymerized substantially in a gaseous phase state in the multistage gaseous phase polymerization reactor 15. In so doing, the polyolefin particles have been grown in advance by polymerization of an olefin in the olefin prepolymerization reactor 13, and the polyolefin particles thus grown are supplied to the multistage gaseous phase polymerization reactor 15. Alternatively, a prepolymerization catalyst or a solid catalyst can be directly supplied to the multistage gaseous phase polymerization reactor 15, and an olefin can be polymerized in the multistage gaseous phase polymerization reactor 15.

In the multistage gaseous phase polymerization reactor 15, an olefin is subjected to homopolymerization by (i) continuously supplying the olefin and hydrogen to the multistage gaseous phase polymerization reactor 15 from the lower part of the multistage gaseous phase polymerization reactor 15 so that a spouted bed is formed in each reaction region 25 and (ii) controlling an amount of the olefin and an amount of the hydrogen so that a composition and a pressure of such a gas are each kept constant. This process will be described in more detail with reference to FIG. 2. The olefin and the hydrogen are continuously supplied to the cylindrical member 12 through the gas supply nozzle 40 so that the spouted bed is formed in each reaction region 25. Such a gas is continuously discharged through the gas discharge nozzle 61. A flow rate of the gas supplied to each reaction region 25 can be adjusted via the line L41.

Note that, instead of the olefin and the hydrogen, an inert gas such as nitrogen can be used in the multistage gaseous phase polymerization reactor 15. Note also that an antistatic agent can be added to the multistage gaseous phase polymerization reactor 15 so that electrification of the polyolefin particles in the multistage gaseous phase polymerization reactor 15 is suppressed.

Note also that, in a case where polypropylene is produced with use of the multistage gaseous phase polymerization reactor 15, a polymerization temperature is, for example, 0° C. to 120° C., preferably 20° C. to 100° C., more preferably 40° C. to 100° C.

In a case where polypropylene is produced with use of the multistage gaseous phase polymerization reactor 15, a polymerization pressure is, for example, a normal pressure to 10 MPa, preferably 0.2 MPa to 8 MPa, more preferably 0.5 MPa to 5 MPa.

In a case where polypropylene is produced with use of the multistage gaseous phase polymerization reactor 15, the gas needs to be supplied to the multistage gaseous phase polymerization reactor 15 so that the gas, circulating in the multistage gaseous phase polymerization reactor 15, has a minimum superficial velocity Ums, disclosed in Japanese Patent Application Publication Tokukai No. 2009-161735, or more, in order that the spouted bed is stably formed in each reaction region 25. In a case where a fluidized bed type olefin polymerization reaction region (not illustrated) is formed in the multistage gaseous phase polymerization reactor 15 by providing a dispersion plate (not illustrated) to the multistage gaseous phase polymerization reactor 15, the gas needs to be supplied to the multistage gaseous phase polymerization reactor 15 so as to have a minimum fluidization velocity Umf, disclosed in Japanese Patent Application Publication Tokukai No. 2009-161735, or more.

A height of the spouted bed formed in each reaction region 25 is equal to or smaller than a maximum spouted bed height LsMAX disclosed in Japanese Patent Application Publication Tokukai No. 2009-161735, and is preferably greater than that of the tubular baffle 30 in view of formation of a stable spouted bed.

Polypropylene particles obtained in the multistage gaseous phase polymerization reactor 15 are transferred to the first fluidized bed type olefin polymerization reactor 17. Then, propylene, ethylene, and hydrogen are continuously supplied to the first fluidized bed type olefin polymerization reactor 17. While an amount of such a gas is being adjusted so that a composition, a temperature, and a pressure of the gas are kept constant, the propylene and the ethylene are copolymerized in the presence of the polypropylene particles.

According to the present embodiment, a polyolefin obtained in the first fluidized bed type olefin polymerization reactor 17 is further transferred to the second fluidized bed type olefin polymerization reactor 19, and operation similar to that carried out in the first fluidized bed type olefin polymerization reactor 17 is carried out in the second fluidized bed type olefin polymerization reactor 19. This makes it possible to produce a polymer material having a different composition. It is thus possible to produce polyolefins having various compositions.

In an embodiment of the present invention, examples of a catalyst used to produce the polyolefin encompass Ziegler-Natta catalysts and metallocene catalysts. The catalyst is preferably a Ziegler-Natta catalyst. Examples of the Ziegler-Natta catalysts encompass: a Ti—Mg catalyst such as a solid catalyst component obtained by bringing a titanium compound into contact with a magnesium compound; and a catalyst containing (i) a solid catalyst component obtained by bringing a titanium compound into contact with a magnesium compound, (ii) an organic aluminum compound, and, as necessary, (iii) a third component such as an electron-donating compound. Out of those catalysts, the catalyst is preferably a catalyst containing (i) a solid catalyst component obtained by bringing a titanium compound into contact with a magnesium compound, (ii) an organic aluminum compound, and, as necessary, (iii) a third component such as an electron-donating compound, and is more preferably a catalyst containing (i) a solid catalyst component obtained by binging a halogenated titanium compound into contact with a magnesium compound, (ii) an organic aluminum compound, and (iii) an electron-donating compound. Alternatively, as the catalyst, a catalyst with which an olefin in a small amount has been brought into contact so that the catalyst is preactivated can be used.

Next, as a specific example of the polyolefin producing method in accordance with the present embodiment, a method of producing a heterophasic propylene polymer material, in which method an olefin is polymerized with use of the polyolefin producing system 11, will be described below in detail with reference to FIG. 1 again.

<Method of Producing Heterophasic Propylene Polymer Material with Use of Polyolefin Producing System 11>

According to the method of producing a heterophasic propylene polymer material (hereinafter, also referred to as a heterophasic propylene polymer material producing method) in accordance with the present embodiment, an olefin is polymerized with use of the polyolefin producing system 11. Specifically, the heterophasic propylene polymer material producing method includes: a step (1) of polymerizing an olefin with use of the multistage gaseous phase polymerization reactor 15 so as to obtain a propylene homopolymer component (I-1), a propylene copolymer component (I-2), or both of the propylene homopolymer component (I-1) and the propylene copolymer component (I-2); and a step (2) of polymerizing an olefin with use of the first fluidized bed type olefin polymerization reactor 17 and with further use of the second fluidized bed type olefin polymerization reactor 19 in the presence of the propylene homopolymer component (I-1), the propylene copolymer component (I-2), or both of the propylene homopolymer component (I-1) and the propylene copolymer component (I-2), each obtained in the step (1), so as to obtain a heterophasic propylene polymer material.

(Heterophasic Propylene Polymer Material)

The heterophasic propylene polymer material in accordance with the present embodiment is:

(i) a propylene polymer material containing the propylene homopolymer component (I-1) and a propylene copolymer component (II);

(ii) a propylene polymer material containing the propylene copolymer component (I-2) and the propylene copolymer component (II); or (iii) a propylene polymer material containing the propylene homopolymer component (I-1), the propylene copolymer component (I-2), and the propylene copolymer component (II). Note that the phrase "propylene polymer material" means a polymer containing a propylene-based monomer unit.

In the present embodiment, the propylene homopolymer component (I-1) is a homopolymer component containing a propylene-based monomer unit.

Each of the propylene copolymer component (I-2) and the propylene copolymer component (II) is, more specifically, the following component.

The propylene copolymer component (I-2) is a copolymer component containing a propylene-based monomer unit and a monomer unit which is based on at least one kind of olefin selected from the group consisting of ethylene and α-olefins having 4 to 12 carbon atoms, the propylene copolymer component (I-2) containing the monomer unit, which is based on at least one kind of olefin selected from the group consisting of ethylene and α-olefins having 4 to 12 carbon atoms, in an amount of not less than 0.01% by weight and less than 15% by weight, preferably not less than 0.01% by weight and less than 12% by weight, more preferably not less than 3% by weight and less than 10% by weight (note that a total weight of the propylene copolymer component (I-2) is regarded as 100% by weight).

The propylene copolymer component (II) is a copolymer component containing (i) a monomer unit which is based on at least one kind of olefin selected from the group consisting of ethylene and α-olefins having 4 to 12 carbon atoms and (ii) a propylene-based monomer unit, the propylene copolymer component (II) containing the monomer unit, which is based on at least one kind of olefin selected from the group consisting of ethylene and α-olefins having 4 to 12 carbon atoms, in an amount of not less than 15% by weight and not more than 80% by weight, preferably not less than 20% by weight and not more than 70% by weight, more preferably not less than 25% by weight and not more than 60% by weight (note that a total weight of the propylene copolymer component (II) is regarded as 100% by weight).

Example of the propylene copolymer component (I-2) encompass a propylene-ethylene copolymer component, a propylene-1-butene copolymer component, a propylene-1-hexene copolymer component, a propylene-1-octene copolymer component, a propylene-1-decene copolymer component, a propylene-ethylene-1-butene copolymer component, a propylene-ethylene-1-hexene copolymer component, a propylene-ethylene-1-octene copolymer component, and a propylene-ethylene-1-decene copolymer component. The propylene copolymer component (I-2) is preferably a propylene-ethylene copolymer component, a propylene-1-butene copolymer component, or a propylene-ethylene-1-butene copolymer component.

Examples of the heterophasic propylene polymer material in accordance with the present embodiment encompass a (propylene)-(ethylene-propylene) heterophasic polymer material, a (propylene-ethylene)-(ethylene-propylene) heterophasic polymer material, and a (propylene)-(ethylene-propylene)-(ethylene-propylene) heterophasic polymer material.

The heterophasic propylene polymer material in accordance with the present embodiment contains the propylene copolymer component (II) in an amount of preferably not less than 32% by weight, more preferably not less than 35% by weight, still more preferably not less than 40% by weight (note that a total weight of the heterophasic propylene polymer material is regarded as 100% by weight).

In the present embodiment, examples of the α-olefins having 4 to 12 carbon atoms, which α-olefins are used for the propylene copolymer component (I-2) or the propylene copolymer component (II), encompass 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene. Out of those α-olefins, 1-butene, 1-hexene, or 1-octene is preferably selected, and 1-butene is more preferably selected.

The heterophasic propylene polymer material producing method in accordance with the present embodiment will be described below in detail with reference to FIG. 1 again.

[Detail of Method of Producing Heterophasic Propylene Polymer Material with Use of Polyolefin Producing System 11]

According to the heterophasic propylene polymer material producing method in accordance with the present embodiment, an olefin is polymerized with use of the polyolefin producing system 11. The heterophasic propylene polymer material producing method includes the following steps (1) and (2).

Step (1)

In the step (1), it is possible to obtain a propylene homopolymer component (I-1), a propylene copolymer component (I-2), or both of the propylene homopolymer component (I-1) and the propylene copolymer component (I-2) by polymerizing an olefin with use of, for example, the multistage gaseous phase polymerization reactor 15.

The propylene homopolymer component (I-1) is obtained by, for example, (i) continuously supplying propylene and hydrogen to the multistage gaseous phase polymerization reactor 15 from the lower part of the multistage gaseous phase polymerization reactor 15 so that a spouted bed is formed in each reaction region 25 in the multistage gaseous phase polymerization reactor 15 and (ii) controlling an amount of the propylene and an amount of the hydrogen so that a composition and a pressure of such a gas are each kept constant.

The propylene copolymer component (I-2) is obtained by, for example, (a) continuously supplying (i) propylene, (ii) a monomer unit which is based on at least one kind of olefin selected from the group consisting of ethylene and α-olefins having 4 to 12 carbon atoms, and (iii) hydrogen to the multistage gaseous phase polymerization reactor 15 from the lower part of the multistage gaseous phase polymerization reactor 15 so that a spouted bed is formed in each reaction region 25 in the multistage gaseous phase polymerization reactor 15 and (b) controlling an amount of the propylene, an amount of the monomer unit, and an amount of the hydrogen so that a composition and a pressure of such a gas are each kept constant.

Note that, according to the heterophasic propylene polymer material producing method in accordance with the present embodiment, a polymerization temperature in the multistage gaseous phase polymerization reactor 15 is, for example, 0° C. to 120° C., preferably 20° C. to 100° C., more preferably 40° C. to 100° C.

Note also that a polymerization pressure in the multistage gaseous phase polymerization reactor 15 is, for example, a normal pressure to 10 MPa, preferably 0.2 MPa to 8 MPa, more preferably 0.5 MPa to 5 MPa.

In a case where polypropylene is produced with use of the multistage gaseous phase polymerization reactor 15, the gas needs to be supplied to the multistage gaseous phase polymerization reactor 15 so that the gas, circulating in the multistage gaseous phase polymerization reactor 15, has a minimum superficial velocity Ums, disclosed in Japanese Patent Application Publication Tokukai No. 2009-161735, or more, in order that the spouted bed is stably formed in each reaction region 25. Further, in a case where a fluidized bed type olefin polymerization reaction region is formed in the multistage gaseous phase polymerization reactor 15 by providing a dispersion plate (not illustrated) to the multistage gaseous phase polymerization reactor 15, the gas needs to be supplied to the multistage gaseous phase polymerization reactor 15 so as to have a minimum fluidization velocity Umf, disclosed in Japanese Patent Application Publication Tokukai No. 2009-161735, or more.

The number of spouted beds formed in the multistage gaseous phase polymerization reactor 15 is three or more, preferably four or more, more preferably five or more.

In view of suppression of production of a gel, a mean residence time of particles in each reaction region 25 formed in the multistage gaseous phase polymerization reactor 15 is preferably 0.1 hours to 1.5 hours, and a total of mean residence times of the particles in the reaction regions 25 is preferably 0.3 hours to 3.0 hours. Note, here, that the phrase "particles" indicates the propylene homopolymer component (I-1) or the propylene copolymer component (I-2). Note also that the phrase "mean residence time" means a value obtained by dividing mass (unit: kg) of the particles which are included in a reaction region by a mass flow rate (unit: kg/hour) of the particles which are removed from the reaction region.

In view of suppression of production of a gel, the reaction regions 25 formed in the multistage gaseous phase polymerization reactor 15 are arranged such that a polymerization amount in a reaction region in which a polymerization amount per unit time is the largest is preferably not more than three times, more preferably not more than twice a polymerization amount in a reaction region in which a polymerization amount per unit time is the smallest.

Step (2) In the step (2), a heterophasic propylene polymer material can be obtained by, for example, polymerizing an olefin with use of the first fluidized bed type olefin polymerization reactor 17 and with further use of the second fluidized bed type olefin polymerization reactor 19 in the presence of the propylene homopolymer component (I-1), the propylene copolymer component (I-2), or both of the propylene homopolymer component (I-1) and the propylene copolymer component (I-2), each obtained in the step (1). The number of fluidized bed type olefin polymerization reactors used in the step (2) can be one, but preferably two or more.

According to the heterophasic propylene polymer material producing method in accordance with the present embodiment, a polymerization temperature in each of the first fluidized bed type olefin polymerization reactor 17 and the second fluidized bed type olefin polymerization reactor 19 is, for example, 0° C. to 120° C., preferably 20° C. to 100° C., more preferably 40° C. to 100° C.

A polymerization pressure in each of the first fluidized bed type olefin polymerization reactor 17 and the second fluidized bed type olefin polymerization reactor 19 is, for example, a normal pressure to 10 MPa, preferably 0.2 MPa to 8 MPa, more preferably 0.5 MPa to 5 MPa.

Further, a gas needs to be supplied to each of the first fluidized bed type olefin polymerization reactor 17 and the second fluidized bed type olefin polymerization reactor 19 so that the gas, circulating in the each of the first fluidized bed type olefin polymerization reactor 17 and the second fluidized bed type olefin polymerization reactor 19, has a minimum fluidization velocity Umf, disclosed in Japanese Patent Application Publication Tokukai No. 2009-161735, or more.

In a case where each of the first fluidized bed type olefin polymerization reactor 17 and the second fluidized bed type olefin polymerization reactor 19 is configured so as to include a dispersion plate (not illustrated), a height of a fluidized bed from the dispersion plate is preferably not more than 10 times greater than a tower diameter.

In view of suppression of production of a gel, a mean residence time of particles in each fluidized bed type olefin polymerization reactor during the step (2) is preferably not less than 0.5 hours. Further, a total of mean residence times of the particles in the fluidized bed type olefin polymerization reactors is preferably 1.0 hour, more preferably not less than 2.0 hours. Note, here, that the phrase "particles" indicates the heterophasic propylene polymer material. Note also that the phrase "mean residence time" means a value obtained by dividing mass (unit: kg) of the particles which are contained in a fluidized bed type olefin polymerization reactor by a mass flow rate (unit: kg/hour) of the particles which are removed from the fluidized bed type olefin polymerization reactor.

In view of suppression of production of a gel, the fluidized bed type olefin polymerization reactors are arranged such that a polymerization amount in a fluidized bed type olefin polymerization reactor in which a polymerization amount per unit time is the largest is preferably not more than three times, more preferably not more than twice a polymerization amount in a fluidized bed type olefin polymerization reactor in which a polymerization amount per unit time is the smallest.

According to the heterophasic propylene polymer material producing method in accordance with the present embodiment, it is possible to prevent a gel from being produced in a large amount in an obtained heterophasic propylene polymer material, by using the polyolefin producing system 11. Furthermore, according to this method, it is possible to continuously produce a heterophasic propylene polymer material stably, because no agglomerate occurs in the multistage gaseous phase polymerization reactor 15.

(Conclusion)

<1> A system for producing a polyolefin, the system including: a cylindrical member which extends in a vertical direction; diameter decreasing members each of which is provided to the cylindrical member, each of the diameter decreasing members having (i) an inner diameter that decreases as the each of the diameter decreasing members extends downward and (ii) a gas inlet opening at a lower end of the each of the diameter decreasing members; spouted bed type olefin polymerization reaction regions each of which is surrounded by (a) an inner surface of a corresponding one of the diameter decreasing members and (b) part of an inner surface of the cylindrical member which part extends upward from the corresponding one of the diameter decreasing members, each of the spouted bed type olefin polymerization reaction regions being a region in which a spouted bed is formed, the number of the spouted bed type olefin polymerization reaction regions being 3 or more; and at least one fluidized bed type olefin polymerization reaction region which is provided at a stage subsequent to the spouted bed type olefin polymerization reaction regions.

<2> The system as set forth in <1>, wherein the at least one fluidized bed type olefin polymerization reaction region includes two or more fluidized bed type olefin polymerization reaction regions.

<3> The system as set forth in <1> or <2>, wherein the at least one fluidized bed type olefin polymerization reaction region is provided at a last stage.

<4> A method of producing a polyolefin, the method including the step of: polymerizing an olefin with use of a system recited in any one of <1> through <3>.

<5> The method as set forth in <4>, wherein: the polyolefin is a propylene copolymer containing a propylene-based monomer unit and a monomer unit which is based on at least one kind of olefin selected from the group consisting of ethylene and α-olefins having 4 to 12 carbon atoms; and assuming that a total weight of the propylene copolymer is 100% by weight, the propylene copolymer contains the propylene-based monomer unit in an amount of not less than 50% by weight and not more than 95% by weight, and contains the monomer unit, which is based on the at least one kind of olefin selected from the group consisting of the ethylene and the α-olefins having 4 to 12 carbon atoms, in an amount of not less than 5% by weight and not more than 50% by weight.

<6> A method of producing a heterophasic propylene polymer material with use of a system recited in any one of <1> through <3>, the method including the steps of: (1) polymerizing an olefin in the spouted bed type olefin polymerization reaction regions so as to obtain a propylene homopolymer component (I-1), a propylene copolymer component (I-2), or both of the propylene homopolymer component (I-1) and the propylene copolymer component (I-2); and (2) polymerizing an olefin in the at least one fluidized bed type olefin polymerization reaction region in the presence of the propylene homopolymer component (I-1), the propylene copolymer component (I-2), or both of the propylene homopolymer component (I-1) and the propylene copolymer component (I-2), each obtained in the step (1), so as to obtain a heterophasic propylene polymer material. The heterophasic propylene polymer material is:

a propylene polymer material containing the propylene homopolymer component (I-1) and a propylene copolymer component (II);

a propylene polymer material containing the propylene copolymer component (I-2) and the propylene copolymer component (II); or a propylene polymer material containing the propylene homopolymer component (I-1), the propylene copolymer component (I-2), and the propylene copolymer component (II).

The propylene copolymer component (I-2) is a copolymer component containing a propylene-based monomer unit and a monomer unit which is based on at least one kind of olefin selected from the group consisting of ethylene and α-olefins having 4 to 12 carbon atoms; and assuming that a total weight of the propylene copolymer component (I-2) is 100% by weight, the propylene copolymer component (I-2) contains the monomer unit, which is based on the at least one kind of olefin selected from the group consisting of the ethylene and the α-olefins having 4 to 12 carbon atoms, in an amount of not less than 0.01% by weight and less than 15% by weight.

The propylene copolymer component (II) is a copolymer component containing (i) a monomer unit which is based on at least one kind of olefin selected from the group consisting of ethylene and α-olefins having 4 to 12 carbon atoms and (ii) a propylene-based monomer unit; and assuming that a total weight of the propylene copolymer component (II) is 100% by weight, the propylene copolymer component (II) contains the monomer unit, which is based on the at least one kind of olefin selected from the group consisting of the ethylene and the α-olefins having 4 to 12 carbon atoms, in an amount of not less than 15% by weight and not more than 80% by weight.

<7> The method as set forth in <6>, wherein, assuming that a total weight of the heterophasic propylene polymer material is 100% by weight, the heterophasic propylene polymer material contains the propylene copolymer component (II) in an amount of not less than 32% by weight.

<Supplementary Note>

The present invention is not limited to the embodiments, but can be altered by a skilled person in the art within the scope of the claims. An embodiment derived from a proper combination of technical means each disclosed in a different embodiment is also encompassed in the technical scope of the present invention.

EXAMPLES

Measured values shown in each of Examples and Comparative Examples below were obtained under the following conditions.

(i) Limiting Viscosity (Unit: dl/g)

Three kinds of samples were prepared by dissolving a polymer in a 1,2,3,4-tetrahydronaphthalene solvent so that the three kinds of samples had respective given concentrations. Such respective polymer concentrations of the three kinds of samples were 0.1 g/dl, 0.2 g/dl, and 0.5 g/dl. Respective reduced viscosities of those samples were measured at a temperature of 135° C. with use of an Ubbelohde viscometer. In accordance with a calculation method shown on page 491 of "*Kobunshi yoeki, Kobunshi jikkengaku* 11 (polymer solutions, experimental polymer science 11)" (1982, published by Kyoritsu Shuppan Co., Ltd.), respective limiting viscosities of the three kinds of samples were obtained by (i) plotting the reduced viscosities with respect to the respective concentrations and (ii) extrapolating the concentrations to zero.

(ii) Ethylene Unit Content (Unit: % by Mass)

In accordance with IR spectral measurement shown on page 619 of "*Kobunshi handobukku* (polymer handbook)" (1995, published by Kinokuniya Company Ltd.), an ethylene unit content was measured by an IR spectral method. Note that the phrase "ethylene unit" means a structural unit which is based on ethylene.

(iii) Polymerization Activity in Each Polymerization Step (Unit: g/g)

Polymerization activity was calculated by dividing mass (g) of a polymer obtained in each polymerization step by mass (g) of a solid catalyst component supplied in the each polymerization step.

(iv) Copolymer Component Content FEP (Unit: % by Mass)

A copolymer component content FEP (unit: % by mass) was calculated by the following expression.

$$FEP = WEP/Wt \times 100$$

where: Wt represents a total amount of a polymer (a homopolymer component and a copolymer component) produced per unit of time; and WEP represents an amount of the copolymer component produced per unit of time in a polymerization step (III).

(v) Limiting Viscosity of Polymer Obtained in Each Polymerization Step (Unit: dl/g)

A limiting viscosity $[\eta]P1$ of a polymer component obtained in a polymerization step (I) (described later), a limiting viscosity $[\eta]P2$ of a polymer component obtained in a polymerization step (II), a limiting viscosity HEP of a copolymer component obtained in the polymerization step (III) were calculated by the following respective expressions.

$$[\eta]P1 = [\eta]1$$

$$[\eta]P2 = ([\eta]2 - [\eta]P1 \times WP1/(WP1+WP2)) \times (WP1+WP2)/WP2$$

$$[\eta]EP = ([\eta]3 - [\eta]P1 \times WP1/100 - [\eta]P2 \times WP2/100) \times 100/WEP$$

where:

$[\eta]1$ represents a limiting viscosity (dl/g) of a polymer obtained in the polymerization step (I);

$[\eta]2$ represents a limiting viscosity (dl/g) of a polymer obtained after the polymerization step (II);

$[\eta]3$ represents a limiting viscosity (dl/g) of a polymer obtained after the polymerization step (III);

WP1 represents an amount (kg/hour) of the polymer produced in the polymerization step (I); and WP2 represents an amount (kg/hour) of the polymer produced in the polymerization step (II).

(vi) Ethylene Unit Content of Polymer Component Obtained in Each Polymerization Step (Unit: % by Mass)

An ethylene unit content EEP (unit: % by mass) of a polymer component obtained in the polymerization step (III) was calculated by the following expression.

$$EEP = E3 \times 100/FEP$$

where E3 represents an ethylene unit content (unit: % by mass) of a polymer obtained after the polymerization step (III).

(vii) Fisheye Count (Unit: Number/100 cm$^2$)

A polymer was supplied to a T-die film processing machine (manufactured by Tanabe Plastics Machinery Co., Ltd., T-die width: 100 mm) equipped with a single-screw extruder having a screw diameter of 20 mmφ, and a sheet having a thickness of 50 μm was produced at a temperature of 210° C. The sheet thus obtained was placed on a platen of a scanner (manufactured by Seiko Epson Corporation, product name: GT-9600, resolution: 1600 dpi). A Hansa Hard Chrome Ferrotype Plate (product name, manufactured by Omiya Shashin Yohin KK) was then placed on the sheet so that a mirror-finished surface of this ferrotype plate faced the sheet. A resolution of the scanner was set to 900 dpi, and a gradation of each pixel was set to 8 bit. An image of the sheet was imported into a computer as a monochrome image, and was stored in bit map format. This image was binarized with use of image analysis software (manufactured by Asahi Kasei Engineering Corporation, product name: "A-zo kun" (registered trademark)). A fisheye was recognized as a region brighter than the other region. The fisheye had an indefinite shape. Therefore, a diameter of a circle having an area identical to that of the fisheye was regarded as a size of the fisheye, and fisheyes each having a diameter of not less than 200 μm were counted. The number of such fisheyes per 100 cm² of the sheet was regarded as a fisheye count.

Operability was evaluated as follows.

Good operability: no agglomerate occurred in a gaseous phase polymerization reactor, and it was possible to continuously produce a polymer.

Poor operability: poor flow of particles in the gaseous phase polymerization reactor deteriorated, and accordingly the particles were poorly removed from the gaseous phase polymerization reactor or agglomerate occurred in the gaseous phase polymerization reactor, so that it was not possible to stably operate the gaseous phase polymerization reactor.

Example 1

[Preparation of Olefin Polymerization Catalyst (Solid Catalyst)]

(1) Synthesis of Solid Catalyst Component for Olefin Polymerization

Step (1-1A): A gas inside a 100-mL flask including a stirrer, a dropping funnel, and a thermometer was replaced with nitrogen. Then, 36.0 mL of toluene and 22.5 mL of titanium tetrachloride were introduced into the flask, and a resultant mixture was stirred. After a temperature inside the flask was set to 0° C., 1.88 g of magnesium ethoxide was introduced 4 times at intervals of 30 minutes at 0° C. Then, a resultant mixture was stirred at 0° C. for 1.5 hours. Next, 0.60 mL of 2-ethoxymethyl-3,3-dimethylbutanoic acid ethyl was introduced into the flask, and then the temperature inside the flask was raised to 10° C. Then, a resultant mixture was stirred at 10° C. for 2 hours, and 9.8 mL of toluene was introduced. Then, the temperature inside the flask was raised at a rate of 1.2 K/min. Then, when the temperature reached 60° C., 3.15 mL of 2-ethoxymethyl-3,3-dimethylbutanoic acid ethyl was introduced into the flask, and the temperature was raised to 110° C. The components thus introduced into the flask were stirred at 110° C. for 3 hours. A resultant mixture was subjected to liquid-solid separation, so that a solid substance was obtained. The solid substance was washed 3 times at 100° C. with use of 56.3 mL of toluene.

Step (1-1B): 38.3 mL of toluene was mixed with the solid substance thus washed, so that a slurry was formed. 15.0 mL of titanium tetrachloride and 0.75 mL of 2-ethoxymethyl-3,3-dimethylbutanoic acid ethyl were mixed with the slurry, so that a mixture was formed. The mixture was stirred at 110° C. for 1 hour. Then, the mixture thus stirred was subjected to liquid-solid separation, so that a solid substance was obtained. The solid substance was washed 3 times at 60° C. with use of 56.3 mL of toluene, and further washed 3 times at a room temperature with use of 56.3 mL of hexane. Then, the solid substance was dried under reduced pressure, so that a solid catalyst component for olefin polymerization was obtained. In the solid catalyst component, a titanium atom content was 2.53% by weight, an ethoxy group content was 0.44% by weight, and an inner electron donor content was 13.7% by weight. A central particle diameter measured by a laser diffraction scattering method was 59.5 μm.

[Prepolymerization]

Into a 3-L SUS autoclave including a stirrer, the following were introduced: 1.3 L of n-hexane, 26 mmol of triethylaluminum, and 2.6 mmol of t-butyl-n-propylmethoxysilane, each of which had been sufficiently dehydrated and degassed. To the autoclave, 10 g of the solid catalyst component was added. Then, while a temperature inside the autoclave was maintained at approximately 10° C., 10 g of propylene was continuously supplied over approximately 30 minutes, so that prepolymerization of the propylene was carried out. Subsequently, a slurry obtained by the prepolymerization of the propylene was transferred to a 150-L SUS316L autoclave including a stirrer. To the autoclave, 100 L of liquid butane was added, so that a slurry of a prepolymerization catalyst component (hereinafter, referred to as a "prepolymerization catalyst component slurry") was obtained.

[Polymerization Step I (Propylene Homopolymerization with Use of Olefin Prepolymerization Reactor)]

Homopolymerization of propylene was carried out with use of, as an olefin prepolymerization reactor, an SUS304 slurry polymerization reactor which included a stirrer and which was of a vessel type. Specifically, propylene, hydrogen, triethylaluminum, t-butyl-n-propyl dimethoxysilane, and the prepolymerization catalyst component slurry were continuously supplied to the reactor, so that the propylene was subjected to a polymerization reaction. Reaction conditions were as follows:

Polymerization temperature: 50° C.
Stirring Speed: 150 rpm
Liquid level of reactor: 18 L
Propylene supply rate: 18 kg/hour
Hydrogen supply rate: 36 NL/hour
Triethylaluminum supply rate: 32.4 mmol/hour
t-butyl-n-propyl dimethoxysilane supply rate: 0.64 mmol/hour
Prepolymerization catalyst component slurry supply rate (on polymerization catalyst component basis): 0.49 g/hour
Polymerization pressure: 2.6 MPa (gage pressure).

According to the reactor, a mean residence time of the slurry was 0.38 hours, and polypropylene particles were discharged at 0.44 kg/hour. Polymerization activity in this polymerization step was 912 g/g. A limiting viscosity of the polypropylene particles obtained was 0.99 dl/g.

[Polymerization Step II (Propylene Homopolymerization (Gaseous Phase Polymerization) by Multistage Gaseous Phase Polymerization Reactor)]

A multistage gaseous phase polymerization reactor was prepared which had 6 reaction regions in a vertical direction, an uppermost reaction region being a reaction region in which a fluidized bed was formed, and the remaining 5 reaction regions being reaction regions in each of which a spouted bed was formed.

From the preceding slurry polymerization reactor to the fluidized bed formed in the uppermost reaction region of the multistage gaseous phase polymerization reactor, a slurry containing the polypropylene particles and liquid propylene was continuously supplied without deactivation.

The polypropylene particles were transferred between the reaction regions in the multistage gaseous phase polymerization reactor by a double valve system. In this transfer system, (i) an upper reaction region and a lower reaction region are connected to each other via a 1-inch wide pipe, (ii) two opening and closing valves are provided on the pipe, (iii) an upper valve is opened while a lower valve is closed, (iv) a powder is supplied from the upper reaction region into part of the pipe which part is located between the valves, (v) the upper valve is closed, and then (vi) the lower valve is opened, so that the polypropylene particles are transferred to the lower reaction region.

From a lower part of the multistage gaseous phase polymerization reactor configured as described above, propylene and hydrogen were continuously supplied. This caused the fluidized bed or the spouted bed to be formed in each of the reaction regions. Then, homopolymerization of the propylene was further carried while the amounts of the propylene and the hydrogen being supplied were controlled and an excess gas was purged so that a constant gas composition and a constant gas pressure were maintained. Reaction conditions were as follows:
Polymerization temperature: 70° C.
Polymerization pressure: 2.0 MPa (gage pressure)
Circulating gas flow rate: 27 m³/hour
Polypropylene particle holdup amount: First reaction region (fluidized bed) 3.1 kg
Second reaction region (spouted bed) 6.9 kg
Third reaction region (spouted bed) 6.7 kg
Fourth reaction region (spouted bed) 5.5 kg
Fifth reaction region (spouted bed) 6.1 kg
Sixth reaction region (spouted bed) 6.5 kg
According to the reactor, a mean residence time was 3.4 hours, a ratio of the gas concentrations in the reactor (hydrogen/(hydrogen+propylene)) was 6.8 mol %, and the polymer particles were discharged at 16.3 kg/hour. Polymerization activity in this polymerization step was 32586 g/g. A limiting viscosity of the polypropylene particles obtained was 1.01 dl/g.

[Polymerization Step III (Propylene-Ethylene Copolymerization (Gaseous Phase Polymerization) by Fluidized Bed Type Olefin Polymerization Reactor)]

The polypropylene particles, which were discharged from the preceding multistage gaseous phase polymerization reactor, were continuously supplied to a fluidized bed type reactor serving as a fluidized bed type olefin polymerization reactor. The fluidized bed type reactor included a gas dispersion plate. The polypropylene particles were transferred from the preceding multistage gaseous phase polymerization reactor to the fluidized bed type reactor by the double valve system.

To the fluidized bed type reactor configured as described above, the following were continuously supplied: propylene, ethylene, and hydrogen. While a gas supply rate was controlled and an excess gas was purged so as to maintain a constant gas composition and a constant gas pressure, the propylene and the ethylene were copolymerized in the presence of the polypropylene particles. Reaction conditions were as follows:
Polymerization temperature: 70° C.
Polymerization pressure: 2.0 MPa (gage pressure)
Circulating gas flow rate: 44 m³/hour
Polymer particle holdup amount: 17 kg According to the reactor, a mean residence time of the polymer particles was 0.71 hours, and ratios of the gas concentrations in the reactor were as follows: (ethylene/(propylene+ethylene))=40.6 mol %; and (hydrogen/(hydrogen+propylene+ethylene))=2.2 mol %. The polymer particles were discharged at 24.0 kg/hour, and were thus produced stably. Polymerization activity in this polymerization step was 15772 g/g. A copolymer component contained in the polymer particles obtained had a limiting viscosity of 2.67 dl/g, and was contained in an amount of 32.0% by mass. An ethylene unit content of the copolymer component was 43.5% by mass. The results are shown in Table 1. An ethylene unit content of a polymer ultimately obtained was 13.9% by mass. These results are shown in Table 1.

Example 2

[Prepolymerization]
Prepolymerization was carried out as in Example 1.
[Polymerization Step I (Propylene Homopolymerization with Use of Slurry Polymerization Reactor)]
Homopolymerization of propylene was carried out as in the polymerization step I of Example 1 except that the reaction conditions were changed as follows:
Triethylaluminum supply rate: 31.4 mmol/hour
t-butyl-n-propyl dimethoxysilane supply rate: 0.61 mmol/hour Prepolymerization catalyst component slurry supply rate (on polymerization catalyst component basis): 0.53/hour
Polymerization pressure: 2.7 MPa (gage pressure)
According to the reactor, a mean residence time of the slurry was 0.37 hours, and polypropylene particles were discharged at 0.48 kg/hour. Polymerization activity in this polymerization step was 895 g/g. A limiting viscosity of the polypropylene particles obtained was 0.99 dl/g.

[Polymerization Step II (Propylene Homopolymerization (Gaseous Phase Polymerization) by Multistage Gaseous Phase Polymerization Reactor)]

With use of a multistage gaseous phase polymerization reactor similar to that used in the polymerization step II of Example 1, homopolymerization of propylene was further carried out as in Example 1 except that the reaction conditions were changed as follows:
Polypropylene particle holdup amount: First reaction region (fluidized bed) 3.1 kg
Second reaction region (spouted bed) 7.3 kg
Third reaction region (spouted bed) 7.5 kg
Fourth reaction region (spouted bed) 6.0 kg
Fifth reaction region (spouted bed) 6.8 kg
Sixth reaction region (spouted bed) 6.5 kg
According to the reactor, a mean residence time was 3.6 hours, a ratio of the gas concentrations in the reactor (hydrogen/(hydrogen+propylene)) was 7.0 mol %, and polymer particles were discharged at 16.5 kg/hour. Polymerization activity in this polymerization step was 30040 g/g. A limiting viscosity of the polypropylene particles obtained was 1.02 dl/g.

[Polymerization Step III (Propylene-Ethylene Copolymerization (Gaseous Phase Polymerization) by Fluidized Bed Type Reactor)]

With use of a fluidized bed type reactor similar to that used in the polymerization step III of Example 1, propylene and ethylene were copolymerized as in Example 1.

According to the reactor, a mean residence time of the polymer particles was 0.78 hours, and ratios of the gas concentrations in the reactor were as follows: (ethylene/(propylene+ethylene))=39.4 mol %; and (hydrogen/(hydrogen+propylene+ethylene))=2.0 mol %. The polymer particles were discharged at 26.6 kg/hour, and were thus produced stably. Polymerization activity in this polymerization step was 48141 g/g. A copolymer component contained in the polymer particles obtained had a limiting viscosity of 2.88 dl/g, and was contained in an amount of 37.6% by mass. An ethylene unit content of the copolymer component was 43.9% by mass. An ethylene unit content of a polymer ultimately obtained was 16.5% by mass. These results are shown in Table 1.

Example 3

[Prepolymerization]
Into a 3-L SUS autoclave including a stirrer, the following were introduced: 1.0 L of n-hexane, 20 mmol of triethylaluminum, and 2.0 mmol of t-butyl-n-propyl dimethoxysilane, each of which had been sufficiently dehydrated and degassed. To the autoclave, 7 g of a solid catalyst component as described in Example 1 was added. Then, while a temperature inside the autoclave was maintained at approximately 10° C., 7 g of propylene was continuously supplied over approximately 30 minutes, so that prepolymerization of the propylene was carried out. Subsequently, a slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I (Propylene-Ethylene Copolymerization with Use of Slurry Polymerization Reactor)]

Propylene and ethylene were copolymerized as in the polymerization step I of Example 1, except that the reaction conditions were changed as follows:
Propylene supply rate: 30 kg/hour
Ethylene supply rate: 0.045 kg/hour
Hydrogen supply rate: 5.4 NL/hour
Triethylaluminum supply rate: 17.9 mmol/hour
t-butyl-n-propyl dimethoxysilane supply rate: 3.58 mmol/hour
Prepolymerization catalyst component slurry supply rate (on polymerization catalyst component basis): 0.35 g/hour
Polymerization pressure: 3.0 MPa (gage pressure)

According to the reactor, a mean residence time of the slurry was 0.24 hours, and polypropylene particles were discharged at 0.48 kg/hour. Polymerization activity in this polymerization step was 1377 g/g. A limiting viscosity of the polypropylene particles obtained was 2.13 dl/g. An ethylene unit content of the polypropylene particles was 1.3% by mass.

[Polymerization Step II (Propylene-Ethylene Copolymerization (Gaseous Phase Polymerization) by Multistage Gaseous Phase Polymerization Reactor)]

With use of a multistage gaseous phase polymerization reactor similar to that used in the polymerization step II of Example 1, propylene and ethylene were copolymerized as in Example 1, except that the reaction conditions were changed as follows:
Polymerization temperature: 57° C.
Polymerization pressure: 1.7 MPa (gage pressure)
Circulating gas flow rate: 32 m³/hour
Polypropylene particle holdup amount: First reaction region (fluidized bed) 3.0 kg
Second reaction region (spouted bed) 6.3 kg
Third reaction region (spouted bed) 7.1 kg
Fourth reaction region (spouted bed) 6.0 kg
Fifth reaction region (spouted bed) 5.8 kg
Sixth reaction region (spouted bed) 6.1 kg According to the reactor, a mean residence time was 5.5 hours, ratios of the gas concentrations in the reactor were as follows: (ethylene/(propylene+ethylene))=4.16 mol %; and (hydrogen/(hydrogen+propylene))=1.1 mol %, and the polymer particles were discharged at 9.7 kg/hour. Polymerization activity in this polymerization step was 26139 g/g. A limiting viscosity of the polypropylene particles obtained was 2.26 dl/g. An ethylene unit content of the polypropylene particles was 5.7% by mass.

[Polymerization Step III-1 (Propylene-Ethylene Copolymerization (Gaseous Phase Polymerization) by Fluidized Bed Type Reactor)]

With use of a fluidized bed type reactor similar to that used in the polymerization step III of Example 1, propylene and ethylene were copolymerized as in the polymerization step III of Example 1, except that the conditions were changed as follows:
Polymerization pressure: 1.7 MPa (gage pressure)
Polymer particle holdup amount: 34 kg According to the reactor, a mean residence time of the polymer particles was 1.7 hours, and ratios of the gas concentrations in the reactor were as follows: (ethylene/(propylene+ethylene))=21.8 mol %; and (hydrogen/(hydrogen+propylene+ethylene))=1.4 mol %. The polymer particles were discharged at 10.3 kg/hour. Polymerization activity in this polymerization step was 29334 g/g.

[Polymerization Step III-2 (Propylene-Ethylene Copolymerization (Gaseous Phase Polymerization) by Fluidized Bed Type Reactor)]

The polypropylene particles, which were discharged from the fluidized bed type reactor in the polymerization step III-1, were continuously supplied to a further subsequent fluidized bed type reactor. By a double valve system, the polypropylene particles were transferred from the fluidized bed type reactor for the polymerization step III-1 to the fluidized bed type reactor for the polymerization step III-2. The fluidized bed type reactor for the polymerization step III-2 included a gas dispersion plate as did the fluidized bed type reactor for the polymerization step III-1.

Propylene and ethylene were copolymerized as in the polymerization step III of Example 1, except that the conditions were changed as follows:
Polymerization temperature: 70° C.
Polymerization pressure: 1.6 MPa (gage pressure)
Circulating gas flow rate: 44 m³/hour
Polymer particle holdup amount: 14 kg According to the reactor, a mean residence time of the polymer particles was 0.59 hours. Ratios of gas concentrations in the reactor were adjusted so as to be similar to those in the polymerization step III-1. The polymer particles were discharged at 24.0 kg/hour, and were thus produced stably. Polymerization activity in this polymerization step was 11371 g/g. A copolymer component contained in the polymer particles obtained had a limiting viscosity of 2.93 dl/g, and was contained in an amount of 65.8% by mass. An ethylene unit content of the copolymer component was 23.8% by mass. An ethylene unit content of a polymer ultimately obtained was 17.6% by mass. These results are shown in Table 2.

Example 4

[Prepolymerization]

Into a 3-L SUS autoclave including a stirrer, the following were introduced: 1.3 L of n-hexane, 26 mmol of triethylaluminum, and 2.6 mmol of t-butyl-n-propyl dimethoxysilane, each of which had been sufficiently dehydrated and degassed. To the autoclave, 10 g of a solid catalyst component as described in Example 1 was added. Then, while a temperature inside the autoclave was maintained at approximately 10° C., 10 g of propylene was continuously supplied over approximately 30 minutes, so that prepolymerization of the propylene was carried out. Subsequently, a slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I (Propylene Homopolymerization with Use of Slurry Polymerization Reactor)]

Homopolymerization of propylene was carried out as in the polymerization step I of Example 1, except that the reaction conditions were changed as follows:
Hydrogen supply rate: 36 NL/hour
Triethylaluminum supply rate: 33.6 mmol/hour
t-butyl-n-propyl dimethoxysilane supply rate: 0.67 mmol/hour
Prepolymerization catalyst component slurry supply rate (on polymerization catalyst component basis): 0.47 g/hour
Polymerization pressure: 2.6 MPa (gage pressure).

According to the reactor, a mean residence time of the slurry was 0.38 hours, and polypropylene particles were discharged at 0.75 kg/hour. Polymerization activity in this polymerization step was 1575 g/g. A limiting viscosity of the polypropylene particles obtained was 1.00 dl/g.

[Polymerization Step II (Propylene Homopolymerization (Gaseous Phase Polymerization) by Multistage Gaseous Phase Polymerization Reactor)]

With use of a multistage gaseous phase polymerization reactor similar to that used in the polymerization step II of Example 1, homopolymerization of propylene was further carried out as in Example 1, except that the reaction conditions were changed as follows:
Polymerization temperature: 70° C.
Polymerization pressure: 2.0 MPa (gage pressure)
Circulating gas flow rate: 27 m³/hour
Polypropylene particle holdup amount: First reaction region (fluidized bed) 2.9 kg
Second reaction region (spouted bed) 5.6 kg
Third reaction region (spouted bed) 5.2 kg
Fourth reaction region (spouted bed) 4.9 kg
Fifth reaction region (spouted bed) 5.3 kg
Sixth reaction region (spouted bed) 5.9 kg According to the reactor, a mean residence time was 3.4 hours, a ratio of the gas concentrations in the reactor (hydrogen/(hydrogen+propylene)) was 6.8 mol %, and the polymer particles were discharged at 15.1 kg/hour. Polymerization activity in this polymerization step was 30197 g/g. A limiting viscosity of the polypropylene particles obtained was 1.00 dl/g.

[Polymerization Step III-1 (Propylene-Ethylene Copolymerization (Gaseous Phase Polymerization) by Fluidized Bed Type Reactor)]

With use of a fluidized bed type reactor similar to that used in the polymerization step III of Example 1, propylene and ethylene were copolymerized as in the polymerization step III of Example 1, except that the conditions were changed as follows:
Polymerization temperature: 70° C.
Polymerization pressure: 2.0 MPa (gage pressure)
Circulating gas flow rate: 44 m³/hour
Polymer particle holdup amount: 27.5 kg According to the reactor, a mean residence time of the polymer particles was 1.0 hour, and ratios of the gas concentrations in the reactor were as follows: (ethylene/(propylene+ethylene))=41.5 mol %; and (hydrogen/(hydrogen+propylene+ethylene))=2.3 mol %. The polymer particles were discharged at 26.6 kg/hour. Polymerization activity in this polymerization step was 24325 g/g. A copolymer component contained in the polymer particles obtained in the polymerization step III-1 had a limiting viscosity of 2.71 dl/g. An ethylene unit content of the copolymer component was 43.4% by mass. The results are shown in Table 3.

[Polymerization Step III-2 (Propylene-Ethylene Copolymerization (Gaseous Phase Polymerization) by Fluidized Bed Type Reactor)]

With use of a fluidized bed type reactor similar to that used in the polymerization step III-2 of Example 3, propylene and ethylene were copolymerized as in the polymerization step III-2 of Example 3, except that the conditions were changed as follows:
Polymerization pressure: 1.9 MPa (gage pressure)
Polymer particle holdup amount: 14.9 kg According to the reactor, a mean residence time of the polymer particles was 0.49 hours, and ratios of the gas concentrations in the reactor were as follows: (ethylene/(propylene+ethylene))=32.0 mol %; and (hydrogen/(hydrogen+propylene+ethylene))=1.9 mol %.

The polymer particles were discharged at 30.6 kg/hour, and were thus produced stably. Polymerization activity in this polymerization step was 8460 g/g. A copolymer component contained in the polymer particles obtained in the polymerization step III-2 had a limiting viscosity of 3.10 dl/g. An ethylene unit content of the copolymer component was 33.6% by mass. The polymerization step III accounted for 52.4% by weight of the whole of the polymerization steps. Of 52.4% by weight, the polymerization step III-1 accounted for 36.5% by weight, and the polymerization step III-2 accounted for 15.9% by weight. An ethylene unit content of a polymer ultimately obtained was 21.2% by mass. These results are shown in Table 3.

Example 5

[Prepolymerization]
Into a 3-L SUS autoclave including a stirrer, the following were introduced: 1.1 L of n-hexane, 22 mmol of triethylaluminum, and 2.2 mmol of t-butyl-n-propyl dimethoxysilane, each of which had been sufficiently dehydrated and degassed. To the autoclave, 5.5 g of a solid catalyst component as described in Example 1 was added. Then, while a temperature inside the autoclave was maintained at approximately 10° C., 27.5 g of propylene was continuously supplied over approximately 30 minutes, so that prepolymerization of the propylene was carried out. Subsequently, a slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I (Propylene Homopolymerization with Use of Slurry Polymerization Reactor)]

Homopolymerization of propylene was carried out as in the polymerization step I of Example 1, except that the reaction conditions were changed as follows:
Hydrogen supply rate: 59 NL/hour
Triethylaluminum supply rate: 24.1 mmol/hour t-butyl-n-propyl dimethoxysilane supply rate: 4.8 mmol/hour
Prepolymerization catalyst component slurry supply rate (on polymerization catalyst component basis): 0.30 g/hour
Polymerization pressure: 2.7 MPa (gage pressure)

According to the reactor, a mean residence time of the slurry was 0.37 hours, and polypropylene particles were discharged at 0.43 kg/hour. Polymerization activity in this polymerization step was 1436 g/g. A limiting viscosity of the polypropylene particles obtained was 0.84 dl/g.

[Polymerization Step II (Propylene Homopolymerization (Gaseous Phase Polymerization) by Multistage Gaseous Phase Polymerization Reactor)]

With use of a multistage gaseous phase polymerization reactor similar to that used in the polymerization step II of Example 1, homopolymerization of propylene was carried out as in Example 1, except that the reaction conditions were changed as follows:
Polymerization temperature: 70° C.
Polymerization pressure: 2.0 MPa (gage pressure)
Circulating gas flow rate: 27 m³/hour
Polypropylene particle holdup amount: First reaction region (fluidized bed) 2.9 kg
Second reaction region (spouted bed) 5.9 kg
Third reaction region (spouted bed) 5.2 kg
Fourth reaction region (spouted bed) 4.9 kg
Fifth reaction region (spouted bed) 5.3 kg
Sixth reaction region (spouted bed) 5.9 kg According to the reactor, a mean residence time was 5.4 hours, a ratio of the gas concentrations in the reactor (hydrogen/(hydrogen+propylene)) was 12.3 mol %, and the polymer particles were discharged at 7.74 kg/hour. Polymerization activity in this polymerization step was 24278 g/g. A limiting viscosity of the polypropylene particles obtained was 0.85 dl/g. The results are shown in Table 3.

[Polymerization Step III-1 (Propylene-Ethylene Copolymerization (Gaseous Phase Polymerization) by Fluidized Bed Type Olefin Polymerization Reactor)]

A fluidized bed type reactor, which had two reaction regions by providing two dispersion plates in a vertical direction, was prepared as a fluidized bed type olefin polymerization reactor.

Polypropylene particles were transferred, by a double valve system as in the polymerization step III of Example 1, from the preceding multistage gaseous phase polymerization reactor to an upper reaction region of the fluidized bed type reactor. A double valve system was also used for transferring the polypropylene particles from an upper fluidized bed in the fluidized bed type reactor to a lower fluidized bed in the fluidized bed type reactor.

From a lower part of the multistage gaseous phase polymerization reactor configured as described above, propylene, ethylene, and hydrogen were continuously supplied. This caused a fluidized bed to be formed in each of the reaction regions. Then, the propylene and the ethylene were further copolymerized while the amounts of the propylene, the ethylene, and the hydrogen being supplied were controlled and an excess gas was purged so that a constant gas composition and a constant gas pressure were maintained. Reaction conditions were as follows:

Polymerization temperature: 70° C.
Polymerization pressure: 2.0 MPa (gage pressure)
Circulating gas flow rate: 37 m$^3$/hour
Polypropylene particle holdup amount: First reaction region (spouted bed) 8.9 kg
Second reaction region (spouted bed) 9.0 kg According to the reactor, a mean residence time of the polymer particles was 1.9 hours, and ratios of the gas concentrations in the reactor were as follows: (ethylene/(propylene+ethylene))=24.7 mol %; and (hydrogen/(hydrogen+propylene+ethylene))=3.7 mol %. The polymer particles were discharged at 10 kg/hour. Polymerization activity in this polymerization step was 7641 g/g.

A copolymer component contained in the polymer particles obtained in the polymerization step III-1 had a limiting viscosity of 2.21 dl/g. An ethylene unit content of the copolymer component was 43.5% by mass. The results are shown in Table 3.

[Polymerization Step III-2 (Propylene-Ethylene Copolymerization (Gaseous Phase Polymerization) by Fluidized Bed Type Reactor)]

With use of a fluidized bed type reactor similar to that used in the polymerization step III-2 of Example 3, propylene and ethylene were copolymerized as in the polymerization step III-2 of Example 3 except that the conditions were changed as follows:

Polymerization pressure: 1.9 MPa (gage pressure)
Circulating gas flow rate: 40 m$^3$/hour
Polymer particle holdup amount: 13 kg According to the reactor, a mean residence time of the polymer particles was 1.2 hours, and ratios of the gas concentrations in the reactor were as follows: (ethylene/(propylene+ethylene))=13.4 mol %; and (hydrogen/(hydrogen+propylene+ethylene))=0.11 mol %. The polymer particles were discharged at 10.6 kg/hour, and were thus produced stably. Polymerization activity in this polymerization step was 1861 g/g. A copolymer component contained in the polymer particles obtained in the polymerization step III-2 had a limiting viscosity of 4.99 dl/g. An ethylene unit content of the copolymer component was 23.7% by mass. The polymerization step III accounted for 27.2% by weight of the whole of the polymerization steps. Of 27.2% by weight, the polymerization step III-1 accounted for 21.5% by weight, and the polymerization step III-2 accounted for 5.8% by weight. An ethylene unit content of a polymer ultimately obtained was 10.7% by mass. These results are shown in Table 3.

Comparative Example 1

[Preparation of Solid Catalyst]

A gas inside a 200-L SUS reaction container including a stirrer was replaced with nitrogen. Then, 80 L of hexane, 6.55 mol of tetrabutoxytitanium, 2.8 mol of diisobutyl phthalate, and 98.9 mol of tetrabutoxysilane were introduced, so that a homogeneous solution was obtained. Then, 51 L of diisobutyl ether solution of butylmagnesium chloride at a concentration of 2.1 mol/L was gradually dropped over 5 hours while a temperature inside the reaction container was maintained at 5° C. After the dropping of the diisobutyl ether solution, a resultant mixture was further stirred for 1 hour at a room temperature. Then, the mixture was subjected to liquid-solid separation at the room temperature, so that a solid substance was obtained. The solid substance was then washed 3 times with 70 L of toluene. Then, toluene was taken out so that a slurry concentration would be 0.6 kg/L. Then, after a mixture (solution) of 8.9 mol of n-butyl ether and 274 mol of titanium tetrachloride were added, 20.8 mol of phthalic chloride was further added. Then, a reaction was made at 110° C. for 3 hours. After the reaction, a resultant substance was washed 2 times with toluene at 95° C. Then, after the slurry concentration was adjusted to 0.6 kg/L, 3.13 mol of diisobutyl phthalate, 8.9 mol of n-dibutyl ether, and 137 mol of titanium tetrachloride were added. Then, a reaction was made at 105° C. for 1 hour. After the reaction, a resultant mixture was subjected to liquid-solid separation at 105° C., so that a solid substance was obtained. The solid substance was then washed 2 times with 90 L of toluene at 95° C. Then, after the slurry concentration was adjusted to 0.6 kg/L, 8.9 mol of n-dibutyl ether and 137 mol of titanium tetrachloride were added. Then, a reaction was made at 95° C. for 1 hour. After the reaction, a resultant mixture was subjected to liquid-solid separation at 95° C., so that a solid substance was obtained. The solid substance was then washed 3 times with 90 L of toluene at 95° C. Then, after the slurry concentration was adjusted to 0.6 kg/L, 8.9 mol of n-dibutyl ether and 137 mol of titanium tetrachloride were added. Then, a reaction was made at 95° C. for 1 hour. After the reaction, a resultant mixture was subjected to liquid-solid separation at 95° C., so that a solid substance was obtained. The solid substance was then washed 3 times with 90 L of toluene at 95° C. Then, the solid substance was further washed 3 times with 90 L of hexane. Then, the solid substance was dried under reduced pressure, so that 11.0 kg of a solid catalyst component was obtained. In the solid catalyst component, a titanium atom content was 1.89% by weight, a magnesium atom content was 20% by weight, a phthalate content was 8.6% by weight, an ethoxy group content was 0.05% by weight, and a butoxy group content was 0.21% by weight. The solid catalyst component had excellent particle properties without a fine powder.

[Prepolymerization]

Into a 3-L SUS autoclave including a stirrer, the following were introduced: 1.5 L of n-hexane, 37.5 mmol of triethylaluminum, and 3.75 mmol of cyclohexylethyl dimethoxysilane, each of which had been sufficiently dehydrated and degassed. To the autoclave, 15 g of the solid catalyst component was added. Then, while a temperature inside the autoclave was maintained at approximately 10° C., 15 g of propylene was continuously supplied over approximately 30 minutes, so that prepolymerization of the propylene was carried out. Subsequently, a slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I (Propylene Homopolymerization with Use of Slurry Polymerization Reactor)]

Homopolymerization of propylene was carried out with use of a 42-L SUS304 slurry polymerization reactor which included a stirrer and which was of a vessel type. Specifically, propylene, hydrogen, triethylaluminum, cyclohexylethyl dimethoxysilane, and the prepolymerization catalyst component slurry were continuously supplied to the reactor, so that the propylene was subjected to a polymerization reaction. Reaction conditions were as follows:

Polymerization temperature: 70° C.
Stirring Speed: 150 rpm
Liquid level of reactor: 18 L
Propylene supply rate: 25 kg/hour
Hydrogen supply rate: 215 NL/hour
Triethylaluminum supply rate: 35.1 mmol/hour
Cyclohexylethyl dimethoxysilane supply rate: 5.3 mmol/hour
Prepolymerization catalyst component slurry supply rate (on polymerization catalyst component basis): 0.57 g/hour
Polymerization pressure: 4.1 MPa (gage pressure)

According to the reactor, a mean residence time of the slurry was 0.79 hours, and polypropylene particles were discharged at 4.93 kg/hour. Polymerization activity in this polymerization step was 8710 g/g. A limiting viscosity of the polypropylene particles obtained was 0.97 dl/g.

[Polymerization Step II (Propylene Homopolymerization (Gaseous Phase Polymerization) by Spouted Bed Type Reactor)]

A spouted bed type reactor, which had two reaction regions in a vertical direction, was prepared. A tubular baffle and a deflector were each made of SUS304 (whose surface was finished with #300 buffing). The other constituent members were made of SUS316 (whose surface was finished with #300 buffing). This reactor was one that was obtained by modifying a fluidized bed type reactor equipped with a stirrer. Specifically, the spouted bed type reactor was obtained by removing the stirrer and a dispersion plate of the fluidized bed type reactor and instead providing, coaxially in the vertical direction, two combinations of the tubular baffle and the deflector. Note that the tubular baffle and the deflector used had shapes and sizes similar to those of the tubular baffle and the deflector used in Example 3.

From the preceding slurry polymerization reactor to an upper reaction region of the spouted bed type reactor, a slurry containing polypropylene particles and liquid propylene was intermittently supplied over a plurality of times. Note that the slurry polymerization reactor and the spouted bed type reactor were connected via a pipe on which an opening and closing valve was provided. An amount of slurry supplied to the spouted bed type reactor was adjusted with use of the opening and closing valve.

From a lower part of the spouted bed type reactor configured as described above, propylene and hydrogen were continuously supplied. This caused a spouted bed to be formed in each of the upper and lower reaction regions. Then, homopolymerization of the propylene was further carried while an excess gas was purged so that a constant gas pressure was maintained. Reaction conditions were as follows:

Polymerization temperature: 70° C.
Polymerization pressure: 1.8 MPa (gage pressure)
Circulating gas flow rate: 140 m$^3$/hour
Propylene supply rate: 20 kg/hour
Hydrogen supply rate: 1360 NL/hour
Polypropylene particle holdup amount: 57 kg (upper reaction region: 28.5 kg, lower reaction region: 28.5 kg)

According to the reactor, a mean residence time of the slurry was 4.2 hours, and polypropylene particles were discharged at 13.6 kg/hour. Polymerization activity in this polymerization step was 15300 g/g. A limiting viscosity of the polypropylene particles obtained was 0.97 dl/g.

[Polymerization Step III (Propylene-Ethylene Copolymerization (Gaseous Phase Polymerization) by Fluidized Bed Type Reactor)]

The polypropylene particles discharged from the preceding spouted bed type reactor were continuously supplied to a fluidized bed type reactor. This fluidized bed type reactor was made of SUS316L, and included a gas dispersion plate and a stirrer.

To the fluidized bed type reactor configured as described above, the following were continuously supplied: propylene, ethylene, and hydrogen. While an excess gas was purged so as to maintain a constant gas pressure, the propylene and the ethylene were copolymerized in the presence of the polypropylene particles. Reaction conditions were as follows:

Polymerization temperature: 70° C.
Polymerization pressure: 1.4 MPa (gage pressure)
Circulating gas flow rate: 140 m$^3$/hour
Propylene supply rate: 34 kg/hour
Ethylene supply rate: 7.3 kg/hour
Hydrogen supply rate: 49 NL/hour
Polymer particle holdup amount: 55 kg According to the reactor was operated so that a mean residence time of the polymer particles was 3.6 hours. The polymer particles were discharged at 19.7 kg/hour, and were thus produced stably. Polymerization activity in this polymerization step was 10800 g/g. A copolymer component contained in the polymer particles obtained had a limiting viscosity of 4.30 dl/g, and was contained in an amount of 30.9% by mass. An ethylene unit content of the copolymer component was 32% by mass. An ethylene unit content of a polymer ultimately obtained was 10% by mass. These results are shown in Table 1.

Comparative Example 2

[Prepolymerization]

Into a 3-L SUS autoclave including a stirrer, the following were introduced: 1.5 L of n-hexane, 30 mmol of triethylaluminum, and 3.9 mmol of cyclohexylethyl dimethoxysilane, each of which had been sufficiently dehydrated and degassed. To the autoclave, 13.3 g of a solid catalyst component similar to that used in Comparative Example 1 was added. Then, while a temperature inside the autoclave was maintained at approximately 10° C., 26.6 g of propylene was continuously supplied over approximately 30 minutes, so that prepolymerization of the propylene was carried out. Subsequently, a resultant slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I-1 (Propylene Homopolymerization with Use of Slurry Polymerization Reactor)]

Homopolymerization of propylene was carried out as in the polymerization step I of Comparative Example 1, except that the reaction conditions were changed as follows:
Polymerization temperature: 75° C.
Propylene supply rate: 20 kg/hour
Hydrogen supply rate: 205 NL/hour
Triethylaluminum supply rate: 40.5 mmol/hour
Cyclohexylethyl dimethoxysilane supply rate: 6.08 mmol/hour
Prepolymerization catalyst component slurry supply rate (on polymerization catalyst component basis): 0.56 g/hour
Polymerization pressure: 4.41 MPa (gage pressure)

According to the reactor, a mean residence time of the slurry was 0.33 hours, and polypropylene particles were discharged at 2.45 kg/hour. Polymerization activity in this polymerization step was 4352 g/g. A limiting viscosity of the polypropylene particles obtained was 0.93 dl/g.

[Polymerization Step I-2 (Propylene Homopolymerization with Use of Slurry Polymerization Reactor)]

The slurry discharged from the preceding reactor was directly supplied to a 163-L SUS304 slurry polymerization reactor which included a stirrer and which was of a vessel type, and homopolymerization of the propylene was continued. Reaction conditions were as follows:
Polymerization temperature: 75° C.
Stirring Speed: 150 rpm
Liquid level of reactor: 44 L
Propylene supply rate: 11 kg/hour
Hydrogen supply rate: 105 NL/hour
Polymerization pressure: 4.0 MPa (gage pressure)

According to the reactor, a mean residence time of the slurry was 0.57 hours, and polypropylene particles were discharged at 5.9 kg/hour. Polymerization activity in this polymerization step was 6133 g/g. A limiting viscosity of the polypropylene particles obtained was 0.93 dl/g.

[Polymerization Step I-3 (Propylene Homopolymerization with Use of Slurry Polymerization Reactor)]

To a reactor configured as was the slurry polymerization reactor used in the polymerization step I-2, the polypropylene particles obtained through the polymerization step I-2 were supplied. Homopolymerization of the propylene was continued as in the polymerization step I-2, except that the reaction conditions were changed as follows:
Polymerization temperature: 70° C.
Propylene supply rate: 6 kg/hour
Hydrogen supply rate: 35 NL/hour
Polymerization pressure: 3.8 MPa (gage pressure)

According to the reactor, a mean residence time of the slurry was 0.51 hours, and polypropylene particles were discharged at 8.1 kg/hour. Polymerization activity in this polymerization step was 3813 g/g. A limiting viscosity of the polypropylene particles obtained was 0.93 dl/g.

[Polymerization Step II (Propylene Homopolymerization (Gaseous Phase Polymerization) by Fluidized Bed Type Reactor)]

The slurry discharged from the preceding slurry polymerization reactor was directly supplied to a fluidized bed type reactor, and homopolymerization of the propylene was continued.

To the fluidized bed type reactor configured as described above, the following were continuously supplied: propylene and hydrogen. While a gas supply rate was controlled and an excess gas was purged so as to maintain a constant gas composition and a constant gas pressure, homopolymerization of the propylene was carried out in the presence of the polypropylene particles. Reaction conditions were as follows:
Polymerization temperature: 80° C.
Polymerization pressure: 1.8 MPa (gage pressure)
Circulating gas flow rate: 100 m$^3$/hour
Polymer particle holdup amount: 40 kg According to the reactor, a mean residence time of the polymer particles was 2.69 hours, and a ratio of the gas concentrations in the reactor (hydrogen/(hydrogen+propylene+ethylene)) was 12.6 mol %. The polymer particles were discharged at 14.9 kg/hour. Polymerization activity in this polymerization step was 12162 g/g. A copolymer component contained in the polymer particles obtained had a limiting viscosity of 0.90 dl/g. The results are shown in Table 1.

[Polymerization Step III (Propylene-Ethylene Copolymerization (Gaseous Phase Polymerization) by Fluidized Bed Type Reactor)]

The slurry discharged from the preceding slurry polymerization reactor was directly supplied to a fluidized bed type reactor (having a capacity of 1.0 m$^3$), and propylene and ethylene were copolymerized.

To the fluidized bed type reactor configured as described above, the following were continuously supplied: propylene, ethylene, and hydrogen. While a gas supply rate was controlled and an excess gas was purged so as to maintain a constant gas composition and a constant gas pressure, the propylene and the ethylene were copolymerized in the presence of the polypropylene particles. Reaction conditions were as follows:
Polymerization temperature: 70° C.
Polymerization pressure: 1.4 MPa (gage pressure)
Circulating gas flow rate: 140 m$^3$/hour
Polymer particle holdup amount: 70 kg According to the reactor, a mean residence time of the polymer particles was 3.29 hours, and ratios of the gas concentrations in the reactor were as follows: (ethylene/(propylene+ethylene))=27.5 mol %; and (hydrogen/(hydrogen+propylene+ethylene))=2.9 mol %. The polymer particles were discharged at 21.3 kg/hour, and were thus produced stably. Polymerization activity in this polymerization step was 11355 g/g. A copolymer component contained in the polymer particles obtained had a limiting viscosity of 2.97 dl/g, and was contained in an amount of 30.0% by mass. An ethylene unit content of the copolymer component was 34.0% by mass. An ethylene unit content of a polymer ultimately obtained was 10.2% by mass. These results are shown in Table 1.

Comparative Example 3

[Prepolymerization]

Into a 3-L SUS autoclave including a stirrer, the following were introduced: 1.7 L of n-hexane, 34 mmol of triethylaluminum, and 3.4 mmol of t-butyl-n-propyl dimethoxysilane, each of which had been sufficiently dehydrated and degassed. To the autoclave, 15.9 g of a solid catalyst component similar to that used in Example 1 was added. Then, while a temperature inside the autoclave was maintained at approximately 10° C., 15.9 g of propylene was continuously supplied over approximately 30 minutes, so that prepolymerization of the propylene was carried out. Subsequently, a resultant slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I-1 (Propylene Homopolymerization with Use of Slurry Polymerization Reactor)]

Homopolymerization of propylene was carried out as in the polymerization step I of Example 1, except that the reaction conditions were changed as follows:

Polymerization temperature: 78° C.
Propylene supply rate: 15 kg/hour
Hydrogen supply rate: 69 NL/hour
Triethylaluminum supply rate: 41.4 mmol/hour
t-butyl-n-propyl dimethoxysilane supply rate: 8.0 mmol/hour
Prepolymerization catalyst component slurry supply rate (on polymerization catalyst component basis): 0.65 g/hour
Polymerization pressure: 4.18 MPa (gage pressure)

According to the reactor, a mean residence time of the slurry was 0.40 hours, and polypropylene particles were discharged at 1.25 kg/hour. Polymerization activity in this polymerization step was 1919 g/g. A limiting viscosity of the polypropylene particles obtained was 0.90 dl/g. The results are shown in Table 1.

[Polymerization Step I-2 (Propylene Homopolymerization with Use of Slurry Polymerization Reactor)]

Homopolymerization of propylene was continued as in the polymerization step I-2 of Comparative Example 2, except that the reaction conditions were changed as follows:

Polymerization temperature: 76° C.
Propylene supply rate: 7 kg/hour
Hydrogen supply rate: 29 NL/hour
Polymerization pressure: 3.8 MPa (gage pressure)

According to the reactor, a mean residence time of the slurry was 0.75 hours, and polypropylene particles were discharged at 1.85 kg/hour. Polymerization activity in this polymerization step was 2850 g/g. A limiting viscosity of the polypropylene particles obtained was 0.90 dl/g.

[Polymerization Step I-3 (Propylene Homopolymerization with Use of Slurry Polymerization Reactor)]

Homopolymerization of propylene was continued as in the polymerization step I-3 of Comparative Example 2, except that the reaction conditions were changed as follows:

Polymerization temperature: 69° C.
Propylene supply rate: 5 kg/hour
Hydrogen supply rate: 16 NL/hour
Polymerization pressure: 3.4 MPa (gage pressure)

According to the reactor, a mean residence time of the slurry was 0.67 hours, and polypropylene particles were discharged at 4.36 kg/hour. Polymerization activity in this polymerization step was 1939 g/g. A limiting viscosity of the polypropylene particles obtained was 0.90 dl/g. The results are shown in Table 1.

[Polymerization Step II (Propylene Homopolymerization (Gaseous Phase Polymerization) by Fluidized Bed Type Reactor)]

Homopolymerization of propylene was continued as in the polymerization step II of Comparative Example 2, except that the reaction conditions were changed as follows:

Circulating gas flow rate: 120 m$^3$/hour
Polymer particle holdup amount: 55 kg

According to the reactor, a mean residence time of the polymer particles was 4.12 hours, and a ratio of the gas concentrations in the reactor (hydrogen/(hydrogen+propylene+ethylene)) was 8.5 mol %. The polymer particles were discharged at 13.4 kg/hour. Polymerization activity in this polymerization step was 13830 g/g. A copolymer component contained in the polymer particles obtained had a limiting viscosity of 0.90 dl/g. The results are shown in Table 1.

[Polymerization Step III (Propylene-Ethylene Copolymerization (Gaseous Phase Polymerization) by Fluidized Bed Type Reactor)]

Propylene and ethylene were copolymerized as in the polymerization step III of Comparative Example 2, except that the reaction conditions were changed as follows:

Circulating gas flow rate: 160 m$^3$/hour
Polymer particle holdup amount: 60 kg

According to the reactor, a mean residence time of the polymer particles was 3.24 hours, and ratios of the gas concentrations in the reactor were as follows: (ethylene/(propylene+ethylene))=29.6 mol %; and (hydrogen/(hydrogen+propylene+ethylene))=2.2 mol %. The polymer particles were discharged at 18.5 kg/hour, and were thus produced stably. Polymerization activity in this polymerization step was 7948 g/g. A copolymer component contained in the polymer particles obtained had a limiting viscosity of 2.73 dl/g, and was contained in an amount of 27.9% by mass. An ethylene unit content of the copolymer component was 34.4% by mass. An ethylene unit content of a polymer ultimately obtained was 9.6% by mass. These results are shown in Table 1.

Comparative Example 4

[Prepolymerization]

Into a 3-L SUS autoclave including a stirrer, the following were introduced: 1.4 L of n-hexane, 28 mmol of triethylaluminum, and 2.8 mmol of cyclohexylethyl dimethoxysilane, each of which had been sufficiently dehydrated and degassed. To the autoclave, 22 g of a solid catalyst component similar to that used in Comparative Example 1 was added. Then, while a temperature inside the autoclave was maintained at approximately 10° C., 44 g of propylene was continuously supplied over approximately 30 minutes, so that prepolymerization of the propylene was carried out. Subsequently, a resultant slurry obtained by the prepolymerization of the propylene was transferred to a 150-L SUS316L autoclave including a stirrer. To the autoclave, 100 L of liquid butane was added, so that a prepolymerization catalyst component slurry was obtained.

[Polymerization Step I (Propylene Homopolymerization with Use of Slurry Polymerization Reactor)]

Homopolymerization of propylene was carried out as in the polymerization step I of Comparative Example 1, except that the reaction conditions were changed as follows:

Propylene supply rate: 18 kg/hour
Hydrogen supply rate: 180 NL/hour
Triethylaluminum supply rate: 43.2 mmol/hour
Cyclohexylethyl dimethoxysilane supply rate: 6.8 mmol/hour
Prepolymerization catalyst component slurry supply rate (on polymerization catalyst component basis): 0.66 g/hour
Polymerization pressure: 4.3 MPa (gage pressure)

According to the reactor, a mean residence time of the slurry was 0.38 hours, and polypropylene particles were discharged at 1.99 kg/hour. Polymerization activity in this polymerization step was 3031 g/g. A limiting viscosity of the polypropylene particles obtained was 0.92 dl/g.

[Polymerization Step II (Propylene Homopolymerization (Gaseous Phase Polymerization) by Multistage Gaseous Phase Polymerization Reactor)]

With use of a multistage gaseous phase polymerization reactor similar to that used in the polymerization step II of Example 1, homopolymerization of propylene was carried out as in Example 1, except that the reaction conditions were changed as follows:
 Polymerization pressure: 1.8 MPa (gage pressure)
 Circulating gas flow rate: 25 m³/hour
 Polypropylene particle holdup amount: First reaction region (fluidized bed) 2.6 kg
  Second reaction region (spouted bed) 5.9 kg
  Third reaction region (spouted bed) 5.9 kg
  Fourth reaction region (spouted bed) 5.9 kg
  Fifth reaction region (spouted bed) 5.8 kg
  Sixth reaction region (spouted bed) 6.0 kg According to the reactor, a mean residence time was 4.1 hours, a ratio of the gas concentrations in the reactor (hydrogen/(hydrogen+propylene)) was 13.8 mol %, and the polymer particles were discharged at 10.8 kg/hour. Polymerization activity in this polymerization step was 13437 g/g. A limiting viscosity of the polypropylene particles obtained was 0.93 dl/g. The results are shown in Table 1.

[Polymerization Step III-1 (Propylene-Ethylene Copolymerization (Gaseous Phase Polymerization) by Spouted Bed Type Reactor)]

A spouted bed type reactor, which had two reaction regions in a vertical direction, was prepared.

Polypropylene particles were transferred, by a double valve system as in the polymerization step III of Example 1, from the preceding multistage gaseous phase polymerization reactor to an upper reaction region of the spouted bed type reactor. A double valve system was also used for transferring the polypropylene particles from an upper spouted bed in the spouted bed type reactor to a lower spouted bed in the spouted bed type reactor.

From a lower part of the multistage gaseous phase polymerization reactor configured as described above, propylene, ethylene, and hydrogen were continuously supplied. This caused a spouted bed to be formed in each of the reaction regions. Then, the propylene and the ethylene were further copolymerized while the amounts of the propylene, the ethylene, and the hydrogen being supplied were controlled and an excess gas was purged so that a constant gas composition and a constant gas pressure were maintained. Reaction conditions were as follows:
 Polymerization temperature: 70° C.
 Polymerization pressure: 1.8 MPa (gage pressure)
 Circulating gas flow rate: 22 m³/hour
 Polypropylene particle holdup amount: First reaction region (spouted bed) 8.9 kg
  Second reaction region (spouted bed) 7.0 kg According to the reactor, a mean residence time of the polymer particles was 1.20 hours, and ratios of the gas concentrations in the reactor were as follows: (ethylene/(propylene+ethylene))=25.6 mol %; and (hydrogen/(hydrogen+propylene+ethylene))=2.2 mol %. The polymer particles were discharged at 14.1 kg/hour. Polymerization activity in this polymerization step was 4977 g/g.

[Polymerization Step III-2 (Propylene-Ethylene Copolymerization (Gaseous Phase Polymerization) by Spouted Bed Type Reactor)]

A spouted bed type reactor, which had one reaction region in a vertical direction, was prepared.

Polypropylene particles were transferred, by a double valve system as in the polymerization step III of Example 1, from the preceding spouted bed type reactor to the reaction region of the spouted bed type reactor.

Propylene and ethylene were copolymerized as in the spouted bed type reactor of the polymerization step III-1, except that the reaction conditions were changed as follows:
 Polypropylene particle holdup amount: 8.9 kg According to the reactor, a mean residence time of the polymer particles was 0.58 hours. Ratios of gas concentrations in the reactor were adjusted so as to be similar to those in the polymerization step III-1. The polymer particles were discharged at 15.5 kg/hour. However, in the polymerization step III, a poor flow of the particles frequently caused trouble with transfer of the particles. This prevented stable production of the particles. Polymerization activity in this polymerization step was 2147 g/g. A copolymer component contained in the polymer particles obtained had a limiting viscosity of 2.76 dl/g, and was contained in an amount of 30.1% by mass. An ethylene unit content of the copolymer component was 31.2% by mass. An ethylene unit content of a polymer ultimately obtained was 9.4% by mass. These results are shown in Table 1.

TABLE 1

| | Process | | Structure | | | | Gel 200 μm> | | | Ethylene unit content |
|---|---|---|---|---|---|---|---|---|---|---|
| | Homo | EP | [η]P [dl/g] | [η]ep [dl/g] | C2'/EP [wt %] | EP [wt %] | Number/100 cm² | Gel count | Operability | [% by mass] |
| Example 1 | L + F + S × 5 | F | 1.01 | 2.67 | 43.5 | 32.0 | 162 | Low | Good | 13.9 |
| Example 2 | L + F + S × 5 | F | 1.02 | 2.88 | 43.9 | 37.6 | 302 | Low | Good | 16.5 |
| Comparative Example 1 | L + S + S | F | 0.97 | 4.30 | 32.0 | 30.9 | 879 | High | Good | 10 |
| Comparative Example 2 | L + L + L + F | F | 0.90 | 2.97 | 34.0 | 30.0 | 681 | High | Good | 10.2 |
| Comparative Example 3 | L + L + L + F | F | 0.90 | 2.73 | 34.4 | 27.9 | 1244 | High | Good | 9.6 |
| Comparative Example 4 | L + F + S × 5 | S | 0.93 | 2.76 | 31.2 | 30.1 | 103 | Low | Poor | 9.4 |

* Abbreviations: "L" stands for bulk polymerization, "S" stands for a spouted bed, and F stands for a fluidized bed.

TABLE 2

| | Process | | [η]rc | [η]ep | Structure C2'/RC | C2'/EP | EP | Operability | Ethylene unit content |
|---|---|---|---|---|---|---|---|---|---|
| | RC | EP | [dl/g] | [dl/g] | [wt %] | [wt %] | [wt %] | | [% by mass] |
| Example 3 | L + F + S × 5 | F + F | 2.26 | 2.93 | 5.70 | 23.8 | 65.8 | Good | 17.6 |

* Abbreviations: "L" stands for bulk polymerization, "S" stands for a spouted bed, and F stands for a fluidized bed.

TABLE 3

| | Process | | [η]P | [η]ep1 | [η]ep2 | Structure C2'/EP1 | C2'/EP2 | EP1 | EP2 | EPt | Gel 200 μm> Number/100 | Operability | Ethylene unit content |
|---|---|---|---|---|---|---|---|---|---|---|---|---|---|
| | Homo | EP | [dl/g] | [dl/g] | [dl/g] | [wt %] | [wt %] | [wt %] | [wt %] | [wt %] | cm² | | [% by mass] |
| Example 4 | L + F + S × 5 | F + F | 1.00 | 2.71 | 3.10 | 43.4 | 33.6 | 36.5 | 15.9 | 52.4 | | Good | 21.2 |
| Example 5 | L + F + S × 5 | F + F + F | 0.85 | 2.21 | 4.99 | 43.5 | 23.7 | 21.5 | 5.8 | 27.2 | 0 | Good | 10.7 |

* Abbreviations: "L" stands for bulk polymerization, "S" stands for a spouted bed, and F stands for a fluidized bed.

INDUSTRIAL APPLICABILITY

A polyolefin obtained with use of the polyolefin producing system in accordance with an embodiment of the present invention is usable as, for example, raw materials of an automobile component (such as an automobile interior component and an automobile exterior component), a food container, a medical container, a component of furniture, a component of an electric appliance, a civil engineering material, a building material, and the like.

REFERENCE SIGNS LIST

11 Polyolefin producing system
12 Cylindrical member
15 Multistage gaseous phase polymerization reactor
17,19 Fluidized bed type olefin polymerization reactor
25 Reaction region
30 Tubular baffle (diameter decreasing member)

The invention claimed is:

1. A method of producing a heterophasic propylene polymer material with use of a system for producing a polyolefin, the system comprising:
a cylindrical member which extends in a vertical direction;
diameter decreasing members each of which is provided to the cylindrical member, each of the diameter decreasing members having (i) an inner diameter that decreases as the each of the diameter decreasing members extends downward and (ii) a gas inlet opening at a lower end of the each of the diameter decreasing members;
spouted bed type olefin polymerization reaction regions each of which is surrounded by (a) an inner surface of a corresponding one of the diameter decreasing members and (b) part of an inner surface of the cylindrical member which part extends upward from the corresponding one of the diameter decreasing members, each of the spouted bed type olefin polymerization reaction regions being a region in which a spouted bed is formed, the number of the spouted bed type olefin polymerization reaction regions being 3 or more; and
at least one fluidized bed type olefin polymerization reaction region which is provided at a stage subsequent to the spouted bed type olefin polymerization reaction regions,
wherein the method comprising the steps of:
(1) polymerizing an olefin in the spouted bed type olefin polymerization reaction regions so as to obtain a propylene homopolymer component (I-1), a propylene copolymer component (I-2), or both of the propylene homopolymer component (I-1) and the propylene copolymer component (I-2); and
(2) polymerizing an olefin in the at least one fluidized bed type olefin polymerization reaction region in the presence of the propylene homopolymer component (I-1), the propylene copolymer component (I-2), or both of the propylene homopolymer component (I-1) and the propylene copolymer component (I-2), each obtained in the step (1), so as to obtain a heterophasic propylene polymer material,
wherein the heterophasic propylene polymer material is:
a propylene polymer material containing the propylene homopolymer component (I-1) and a propylene copolymer component (II);
a propylene polymer material containing the propylene copolymer component (I-2) and the propylene copolymer component (II); or
a propylene polymer material containing the propylene homopolymer component (I-1), the propylene copolymer component (I-2), and the propylene copolymer component (II),
wherein: the propylene copolymer component (I-2) is a copolymer component containing a propylene-based monomer unit and a monomer unit which is based on at least one kind of olefin selected from the group consisting of ethylene and α-olefins having 4 to 12 carbon atoms; and
assuming that a total weight of the propylene copolymer component (I-2) is 100% by weight, the propylene copolymer component (I-2) contains the monomer unit, which is based on the at least one kind of olefin selected from the group consisting of the ethylene and the α-olefins having 4 to 12 carbon atoms, in an amount of not less than 0.01% by weight and less than 15% by weight, wherein: the propylene copolymer component (II) is a copolymer component containing (i) a monomer unit which is based on at least one kind of olefin selected from the group consisting of ethylene and α-olefins having 4 to 12 carbon atoms and (ii) a propylene-based monomer unit; and assuming that a total weight of the propylene copolymer component (II) is 100% by weight, the propylene copolymer component (II) contains the monomer unit, which is based on the at least one kind of olefin selected from the group consisting of the ethylene and the α-olefins having 4 to 12 carbon atoms, in an amount of not less than 15% by weight and not more than 80% by weight, wherein, assuming that a total weight of the heterophasic propylene polymer material is 100% by weight, the heterophasic propylene polymer material contains the propylene copolymer component (II) in an amount of not less than 32% by weight.

2. The method as set forth in claim 1, wherein the at least one fluidized bed type olefin polymerization reaction region includes two or more fluidized bed type olefin polymerization reaction regions.

3. The method as set forth in claim 1, wherein the at least one fluidized bed type olefin polymerization reaction region is provided at a last stage.

* * * * *